United States Patent [19]

Charles

[11] Patent Number: 4,565,474
[45] Date of Patent: Jan. 21, 1986

[54] METHOD OF GENERATING INVOLUTE TOOTH FORMS WITH A MILLING CUTTER

[75] Inventor: Paul A. S. Charles, Rockford, Ill.

[73] Assignee: The Ingersoll Milling Machine Company, Rockford, Ill.

[21] Appl. No.: 485,408

[22] Filed: Apr. 15, 1983

Related U.S. Application Data

[63] Continuation-in-part of Ser. No. 207,225, Nov. 1, 1980, abandoned.

[51] Int. Cl.⁴ .................................... B23F 5/20
[52] U.S. Cl. ........................... 409/51; 51/52 R; 409/38; 409/40; 409/55
[58] Field of Search ............... 409/10, 31, 38, 39, 409/40, 41, 51, 54, 48, 26, 25, 27, 30, 34–36, 28, 45, 200, 50, 55; 51/123 G, 48 HE, 165.87, 52 R, 52 HB, 95 GH; 407/38

[56] References Cited

U.S. PATENT DOCUMENTS

| | | | |
|---|---|---|---|
| 1,516,524 | 11/1924 | Fellows | 409/40 X |
| 1,609,331 | 12/1926 | Trbojevich . | |
| 1,858,568 | 5/1932 | Wildhaber | 51/95 GH |
| 1,964,233 | 6/1934 | Uhlich | 51/95 GH |
| 2,024,747 | 12/1935 | Samek | 409/27 |
| 2,342,232 | 2/1944 | Wildhaber | 409/29 X |
| 2,538,999 | 1/1951 | Wildhaber | 409/55 X |
| 2,567,460 | 9/1951 | Aeppli . | |
| 2,725,792 | 12/1955 | Wildhaber | 409/29 |
| 2,783,686 | 3/1957 | Ciallie et al. | 409/26 |
| 3,044,221 | 7/1962 | Graf | 51/123 G |
| 3,499,252 | 3/1970 | Cleff | 51/123 G |
| 3,583,278 | 6/1971 | Baxter | 409/29 X |
| 3,708,843 | 1/1973 | Enkfritz | 407/38 |
| 3,753,319 | 8/1973 | Mesey | 51/48 HE X |
| 3,877,150 | 4/1975 | Höfler | 409/38 X |
| 3,916,569 | 11/1975 | Wydler et al. | 51/33 W |
| 4,183,703 | 1/1980 | Kotthaus | 409/30 X |
| 4,203,260 | 5/1980 | Fivian | 51/123 G |
| 4,370,080 | 1/1983 | Goode | 409/200 |
| 4,393,625 | 7/1983 | Bloch et al. | 51/165.87 |

OTHER PUBLICATIONS

Dudley, *Gear Handbook*, McGraw-Hill, 1962, New York, pp. 4:30–48, 7:1–9, 8:6–7 & 14–20.

*Primary Examiner*—Gil Weidenfeld
*Assistant Examiner*—Glenn L. Webb
*Attorney, Agent, or Firm*—Fitch, Even, Tabin & Flannery

[57] ABSTRACT

An involute external tooth profile is cut into the periphery of a gear blank by positioning a rotating milling cutter with its cutting path perpendicular to the plane of action of the desired base surface of revolution within the gear blank so as to penetrate the plane of action from the side thereof opposite to the base surface and with a predetermined line of intersection which generates the involute profile as the base surface rolls upon the plane of action. The rolling action causes the generating line to traverse the blank between its addendum surface and a depth sufficient to provide the desired length of active profile.

40 Claims, 52 Drawing Figures

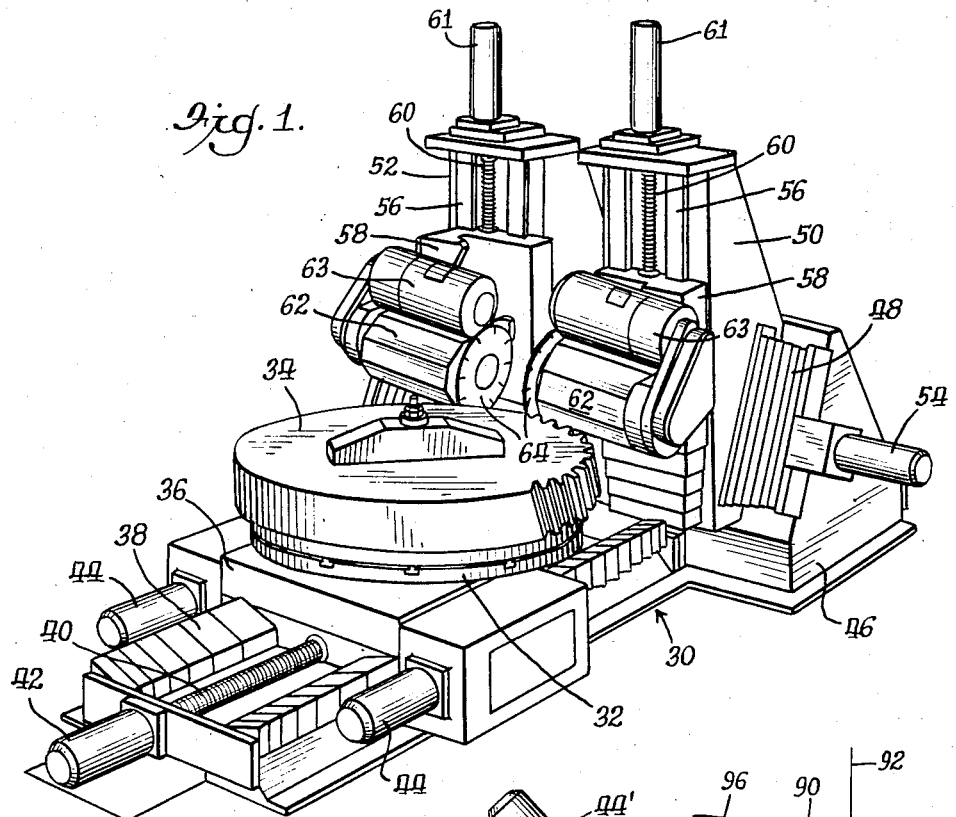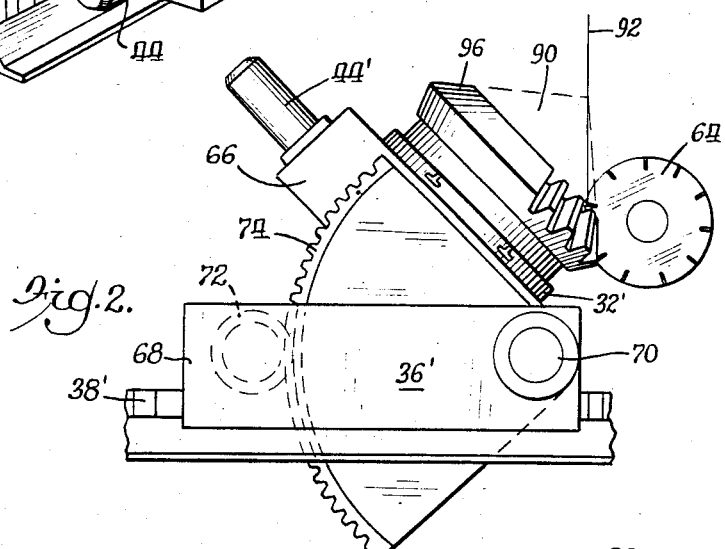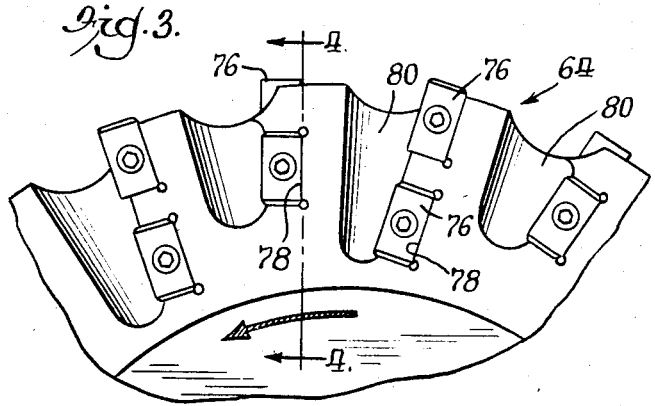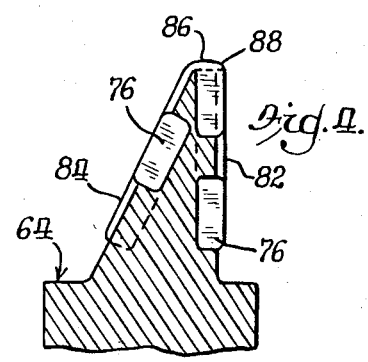

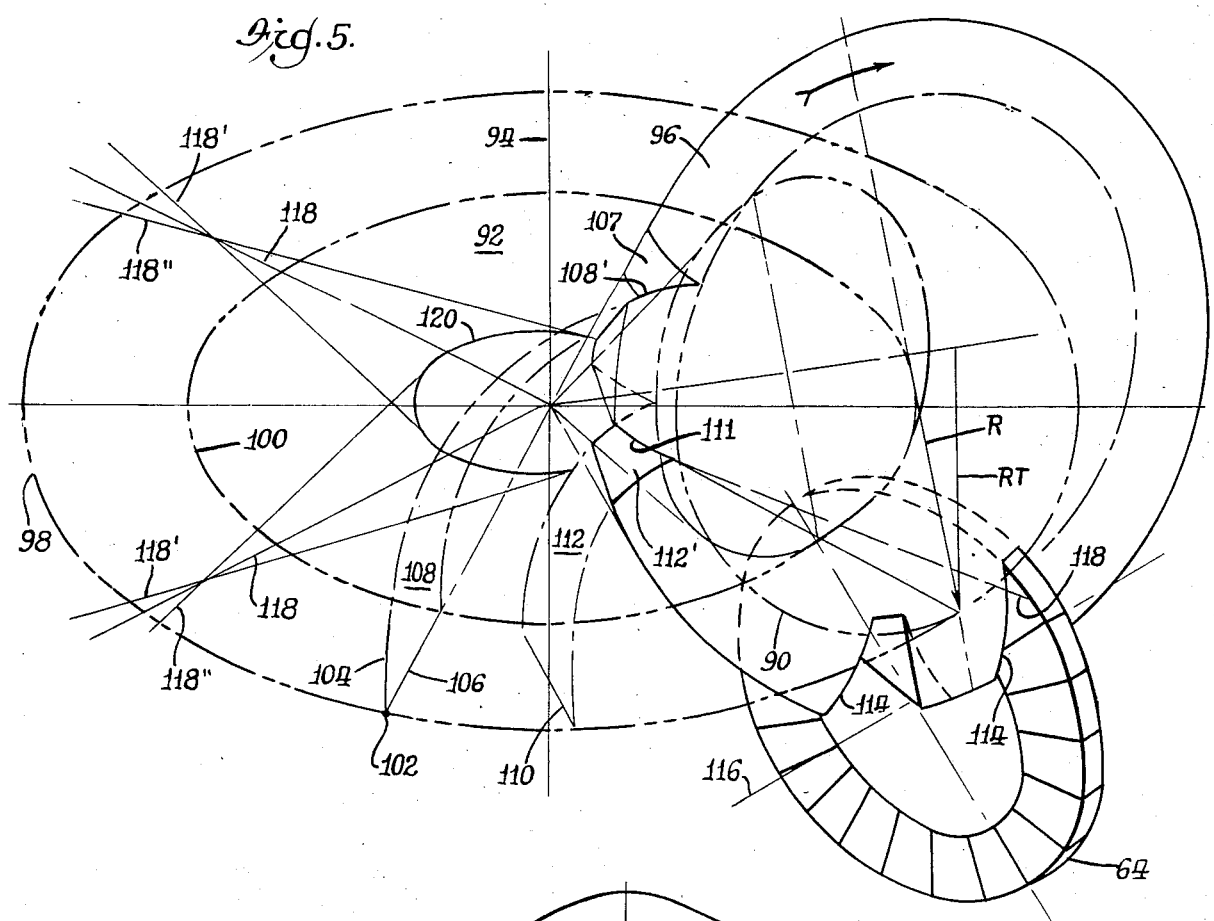

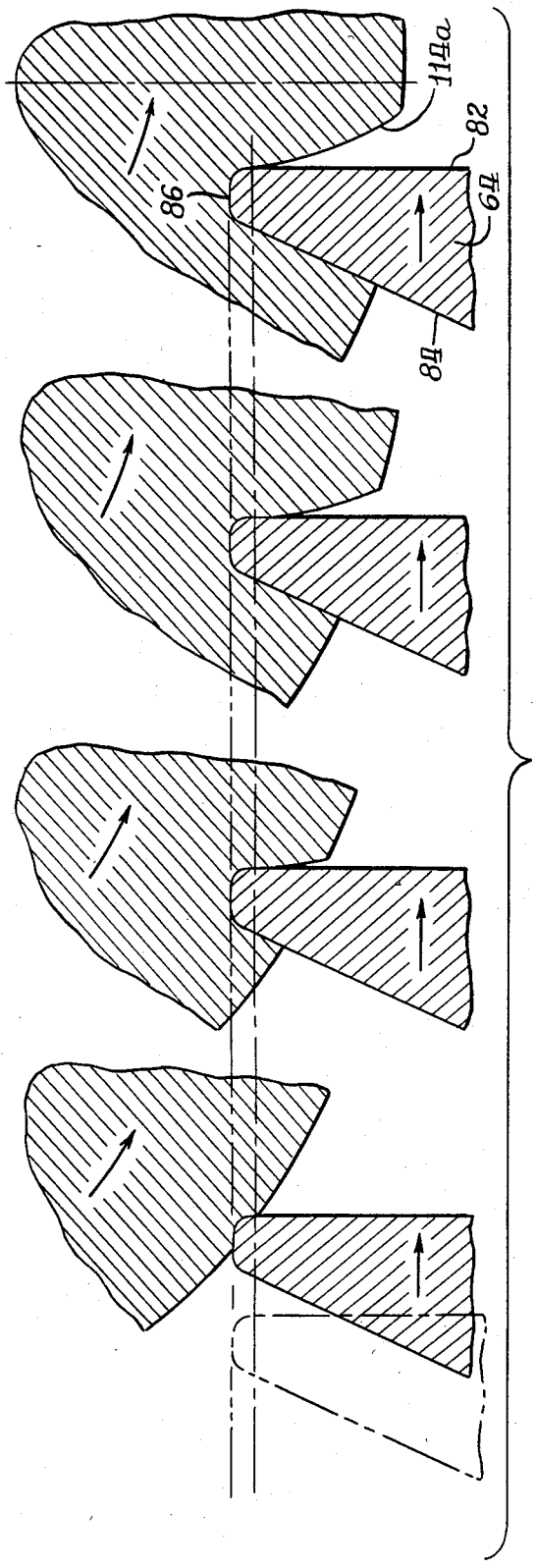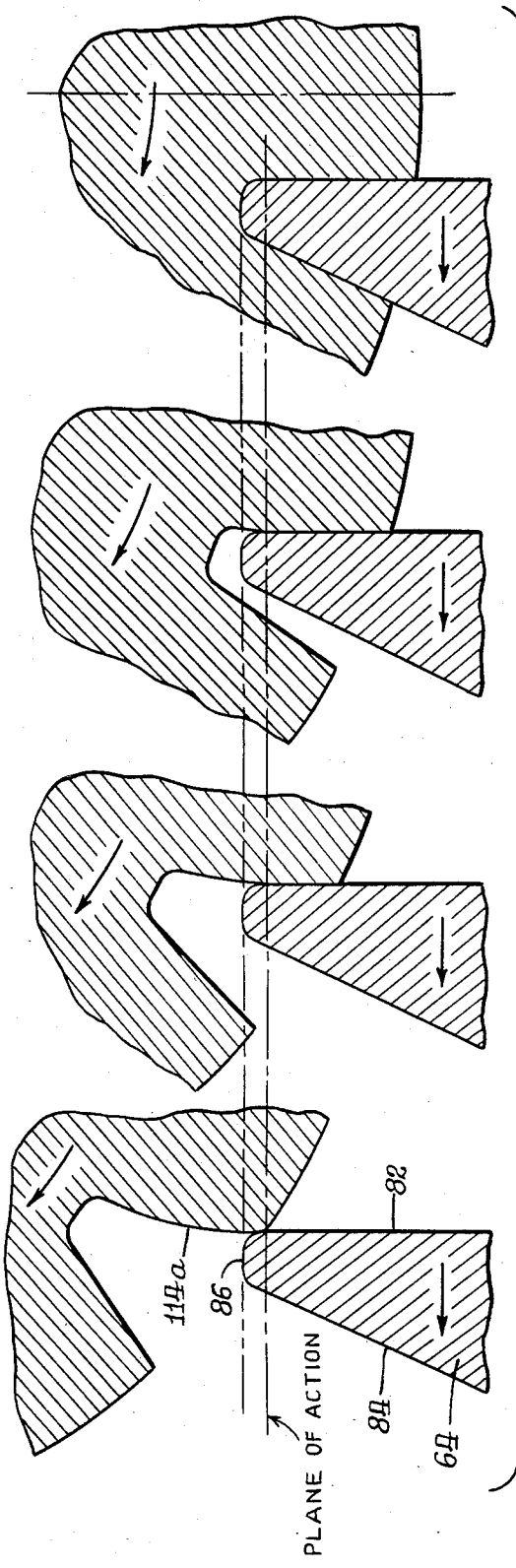
Fig. 7.
Fig. 8.

Fig. 14. Fig. 15. Fig. 16. Fig. 17.
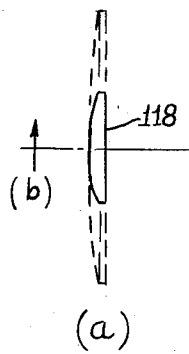
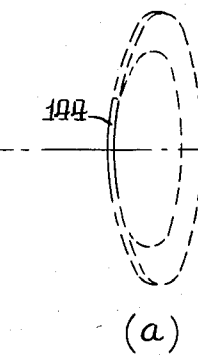
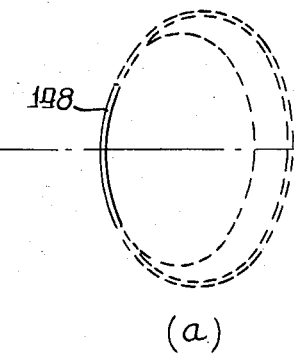
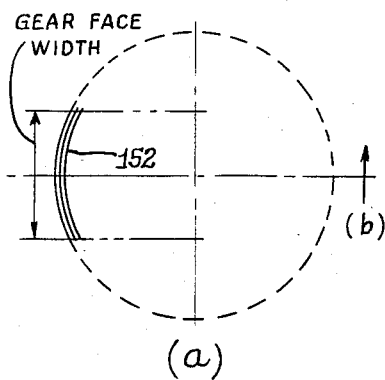
(a) (a) (a) (a)
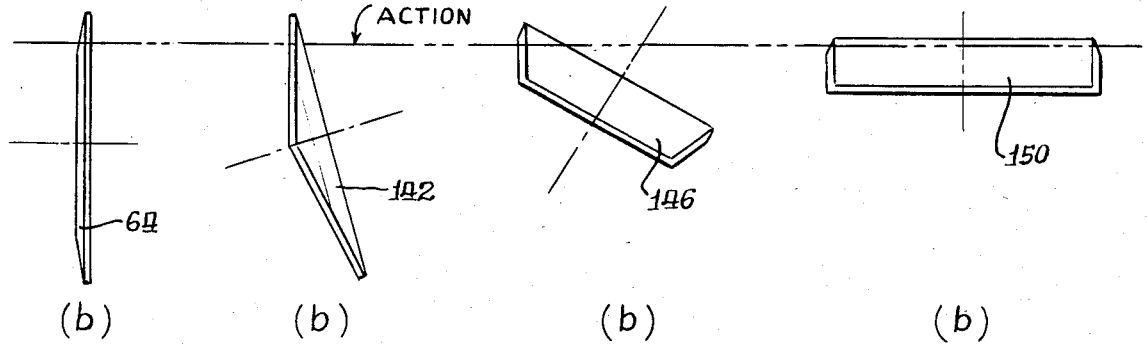
(b) (b) (b) (b)
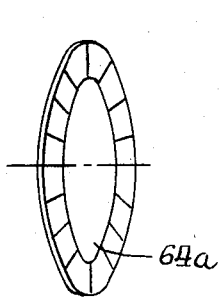
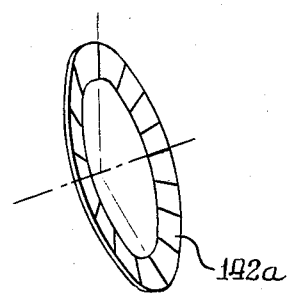
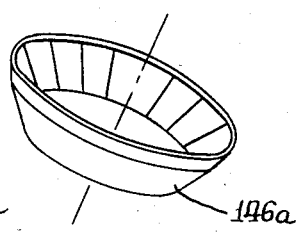
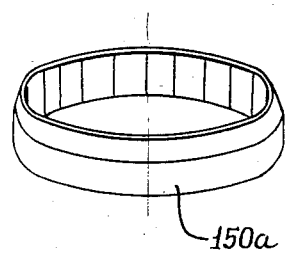
(c) (c) (c) (c)
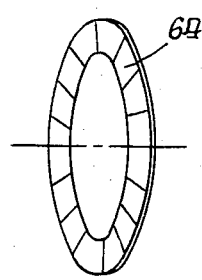
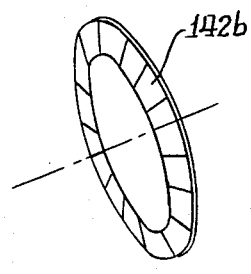
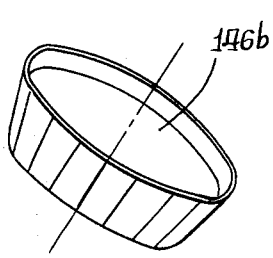
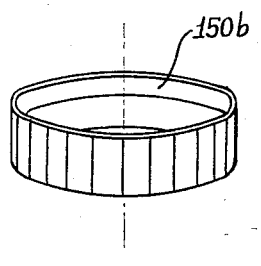
(d) (d) (d) (d)

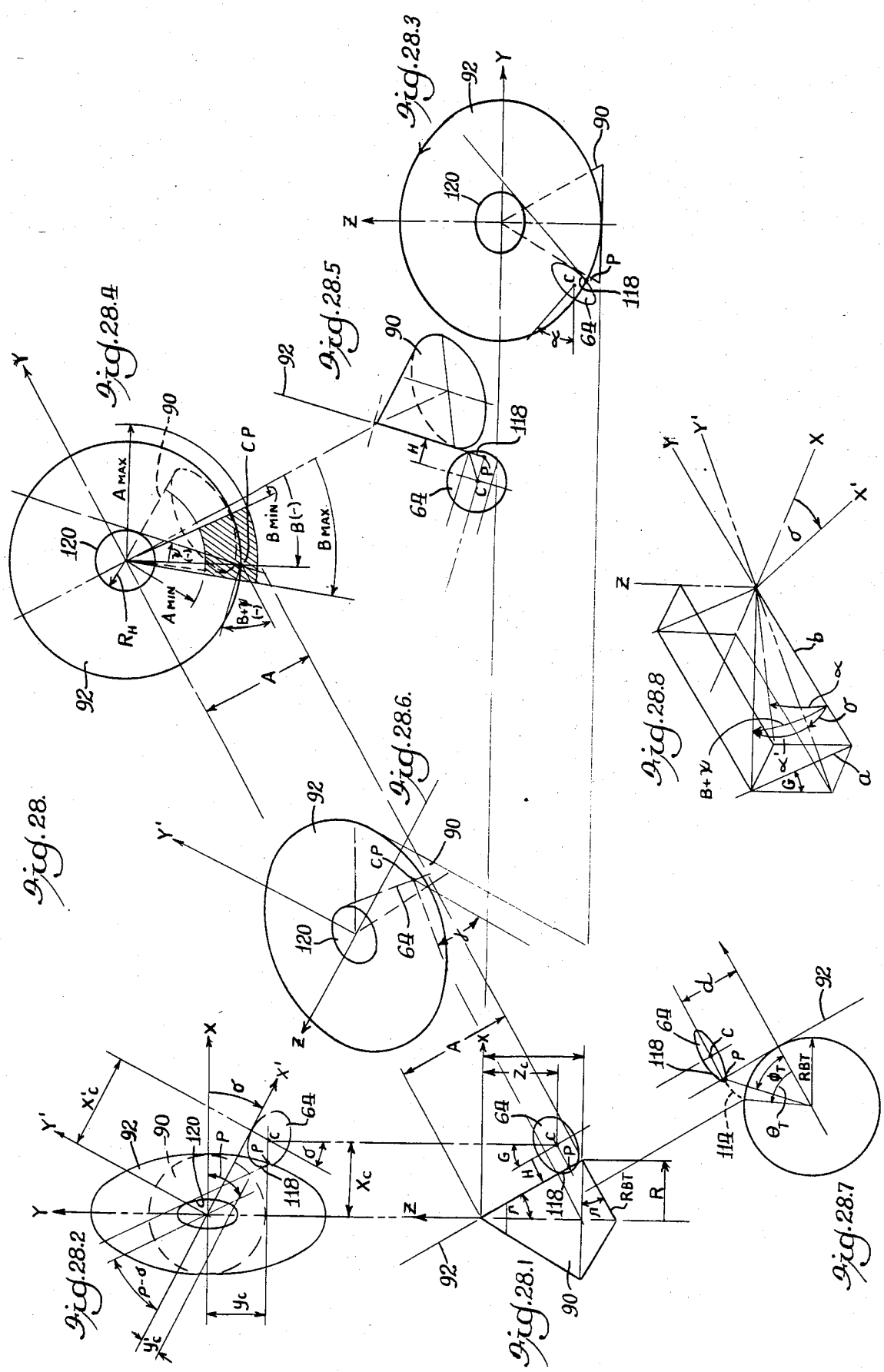

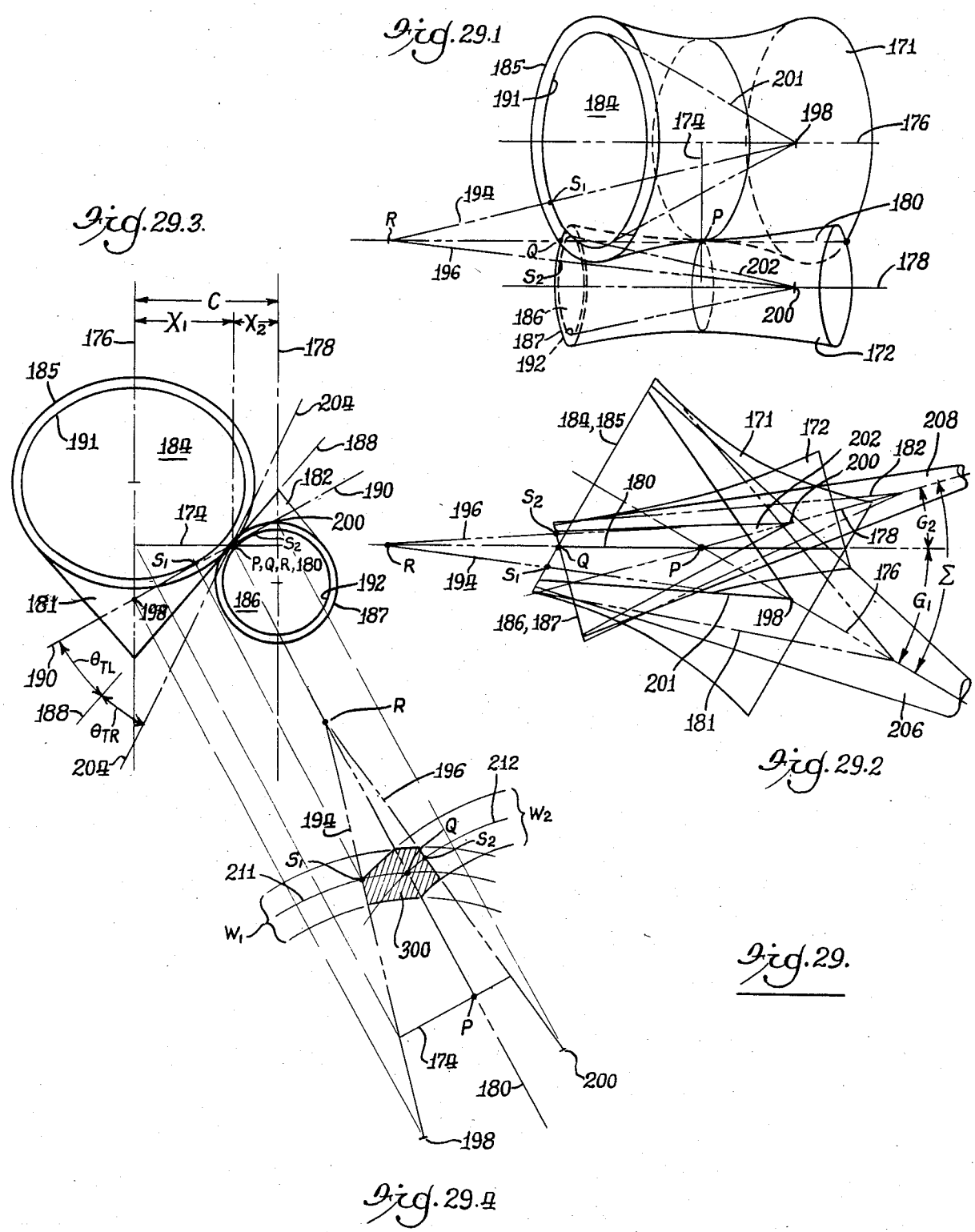

METHOD OF GENERATING INVOLUTE TOOTH FORMS WITH A MILLING CUTTER

This is a Continuation-In-Part of prior copending application Ser. No. 207,225, filed Nov. 1, 1980 now abandoned.

My invention is a method of milling or otherwise machining the involute profiles of the teeth of conical (i.e., bevel) or cylindrical gears, with teeth either axially straight, or helical, or curved.

My method is a generalized method in several senses. Firstly, it generates tooth profiles individually, rather than cutting teeth as such, and thus allows the gear designer great freedom in the design of gears. Secondly, the method is generalized in the sense that, being independent of specific tooth forms per se, it can be used to machine all forms of external involute gears having true conjugate action, the method treating the familiar spur and helical gears merely as a limiting case of the more general case of conical gears.

BACKGROUND OF THE INVENTION

The several methods now widely used commercially for cutting gears from gear blanks, i.e., hobbing, shaping, and milling with rotary form cutters, are all based upon the use of a dedicated tool which will cut only teeth of a single form and size.

Hobbing is a continuous process in which the involute profiles of the teeth of cylindrical gears are generated by the rotation of a series of helically arrayed cutters whose individual cutting edges sweep a conical path. In this arrangement, the cutting speed of the tool and the generating movement of the tool with respect to the gear blank are interdependent, and the gear teeth are generated incrementally about the entire periphery of the gear blank as the cutter is slowly fed axially of the rotating gear blank.

In disc shaping, or gear shaping, the reciprocating cutter itself is in the form of an involute gear, and both the shaping cutter and the gear blank are incrementally indexed by rotating both with the same pitch-surface advance before each cutting stroke after the cutter has entered the gear blank radially to the desired cutting depth.

With the rack shaping method, i.e., where the reciprocating tool assumes the form of a rack to be meshed with the gear to be formed, the involute tooth profile is also generated by incremental indexing rotation of the gear blank with concurrent tangential index of the rack equal to the pitch circle index of the gear blank before each stroke of the cutter after the rack has entered the gear blank radially to the necessary depth. The process differs from disc or gear shaping in that the length of the rack cutter is limited by practical considerations, and requires tooth-indexing of the gear blank relative to the cutter.

Both disc and rack shaping are intermittent processes as the tool in each case cuts only on the forward stroke and is idle on the return.

Milling with rotary form cutters, i.e., an axial or helical cut with cutting edges shaped to the involute profile to be left upon the gear teeth, likewise requires tooth indexing of the gear blank relative to the cutter. In some instances, slot milling with an ordinary cutter is employed as a preliminary roughing operation to be followed by a finishing operation with a rotary cutter having the correct involute form, or by hobbing or rack shaping.

Compared with each other, these prevailing methods have their advantages and disadvantages. For example, the cutting paths swept by hobs, being conical surfaces of revolution, leave helical scallops on the profile of the tooth. The resulting surface of the profile may be undesirably erose if the axial feed of the hob during or between successive passes is not limited, resulting in relatively slow production due either to the limited axial feed required for the sake of acceptable finish, or to the subsequent shaving or grinding operation which may be required to achieve it.

The primary common disadvantage, however, of all of these cutting methods is their reliance upon the concept of basic racks having standardized tooth and tooth-space proportions and pressure angles. The hob, the disc shaper, the rack shaper, and the rotary form cutter embody a single tooth form dictated by one of the basic racks. A different tool is therefore needed for each variation in diametral pitch, circular pitch, and metric module; for each variation in pressure angle; for each variation in depth proportions, whether of full depth or one of the stub tooth variations; for each variation of root-fillet radius; and, finally, for each variation of function in the production sequence, i.e., roughing, pre-grind, pre-shave, or finishing.

In addition, different tools are required in some systems to adapt them for helical gears, and even for the hand of the helix, right or left.

Bevel gears, whether straight-toothed or helical, require still different machines and tooling systems.

Moreover, as the design of gear teeth is to some degree the compromise of conflicting criteria, the relatively complex calculations involved in resolving them, combined with the cost of tool inventory for gear-cutting systems premised on the rack form, has led to the development of standard data for standardized gears which has put gear design into fairly rigid confinement.

OBJECTIVES AND BRIEF DESCRIPTION OF THE INVENTION

The general aim of this invention, accordingly, is to free the design and manufacture of gears from the restraints imposed by rack-based cutting systems by providing an improved method of cutting gears which recognizes no fundamental difference between cylindrical and conical (bevel) gears, and in which the involute profile of both straight and helical gear teeth is generated by a rotary milling cutter having a plane face. The cutter may therefore be of very simple construction, may use indexable inserts, and the same cutter may be employed to cut tooth forms of a number of sizes, pitches, depths, and pressure angles, or which are asymmetric, or modified in profile by undercutting or tip-relieving, or modified axially by crowning or tapering. Moreover, the method of the invention can, if desired, combine roughing and finishing into a single operation, cut multiple tooth flanks simultaneously in the same gear blank, and cut gears of large diameter and extended face width.

While the method is explained in the following specification in its application to the machining of the gear teeth of right circular conical and cylindrical gears, which dominate the field of gearing, it is not so limited, but may be used, for example, to machine the teeth of meshable gears with axes askew in different planes, or of conical or cylindrical gears of variable curvature, i.e., whose directrices are ellipses, spirals, etc.

THE DRAWINGS

The accomplishment of these objectives will become apparent from the following detailed description made in conjunction with the accompanying drawings, in which:

FIG. 1 is a perspective view of a twin-head, 8-axis milling machine designed to perform the method of this invention on both cylindrical and conical gears;

FIG. 2 is a fragmentary side elevational view of a modification of the machine of FIG. 1 to convert the same to 9-axis operation;

FIG. 3 is a fragmentary elevational view of the back side of a plane milling cutter designed for practicing the method of the invention;

FIG. 4 is a fragmentary sectional view taken along the line 4—4 of FIG. 3;

FIG. 5 is a diagrammatic perspective view of the generation of the involute tooth form in a conical gear blank by a plane cutter such as that of FIGS. 3 and 4, showing the positions of the cutter relative to the plane of action and to the gear blank for generating either straight or helical teeth;

FIG. 6 is a diagrammatic view of nature similar to FIG. 5 illustrating the generation of the involute tooth profile in a cylindrical gear by a plane cutter, with similar indication of the cutter placement relative to the plane of action and to the gear blank for straight and helical teeth;

FIGS. 7 and 8 are fragmentary diagrammatic views showing schematically the progression of the cutter and the gear blank while generating the involute tooth profile with a plane cutter on a machine such as that of FIG. 1 and FIG. 2;

Figure 12:
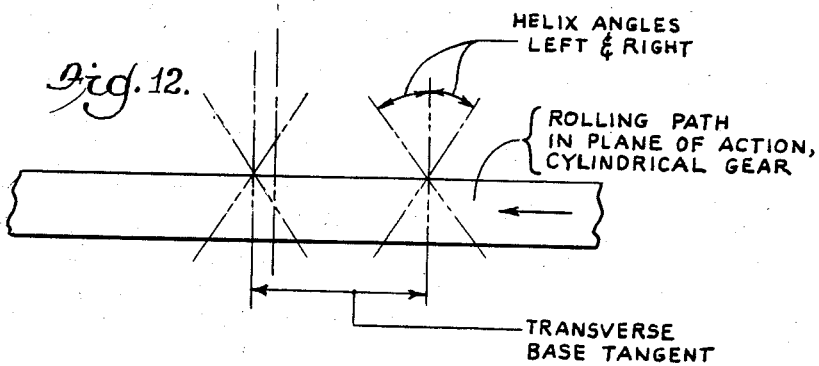
Figure 13:
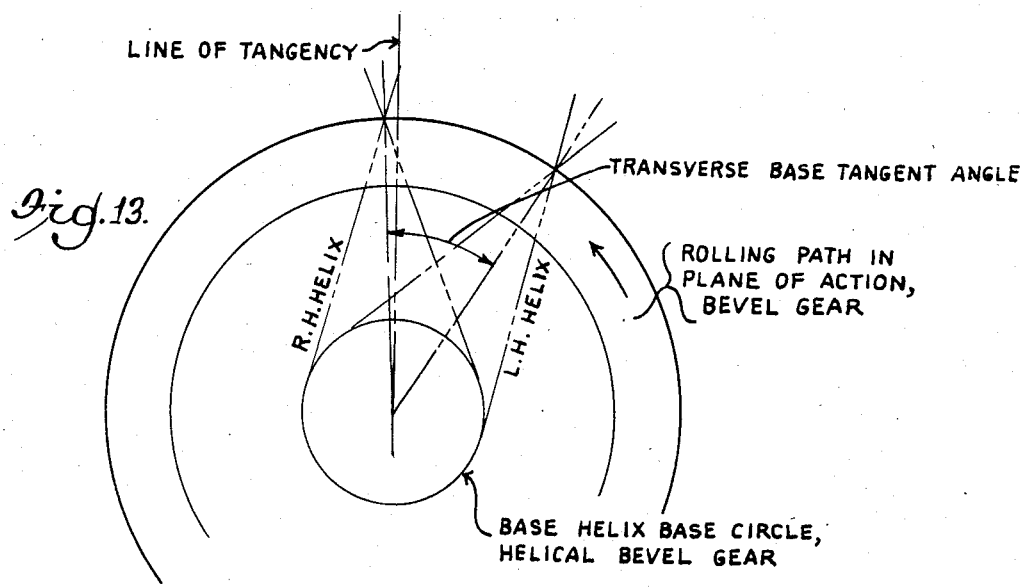
Figure 19A:
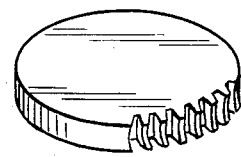
Figure 19B:
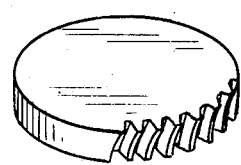
Figure 19C:
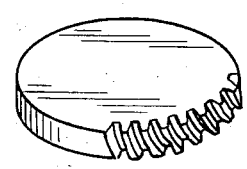
Figure 20:
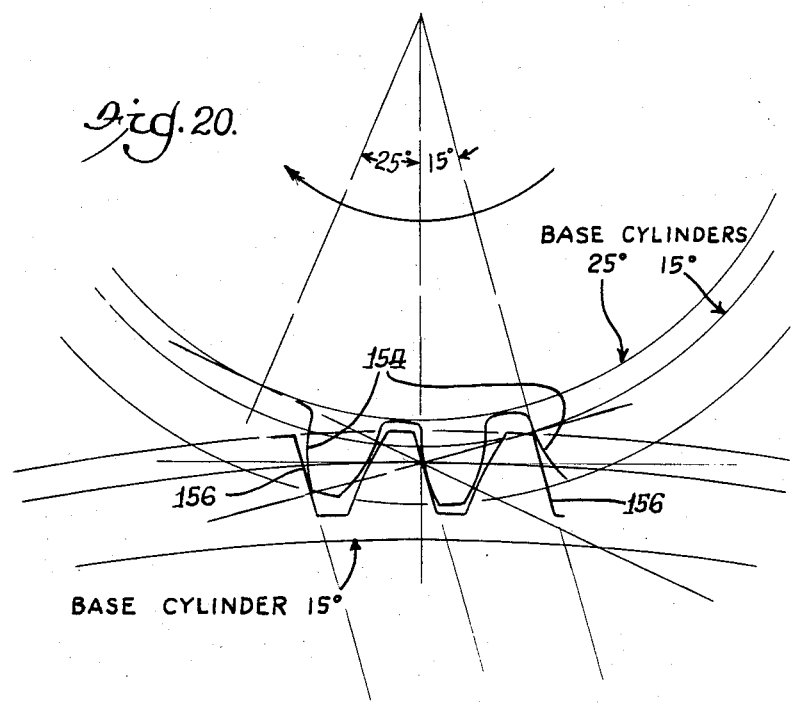
Figure 21:
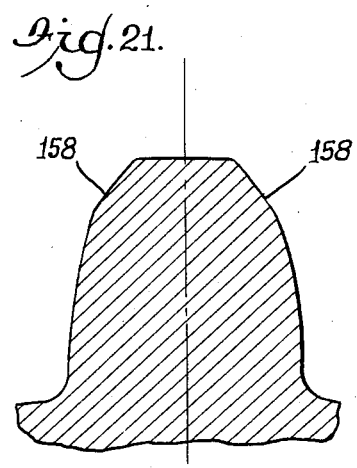
Figure 22:
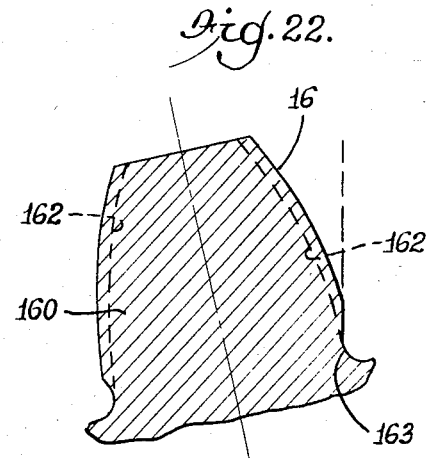
Figure 23:
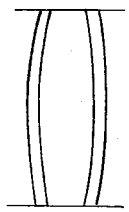
Figure 24:
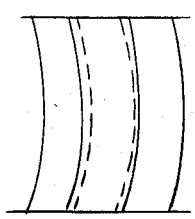
Figure 25:
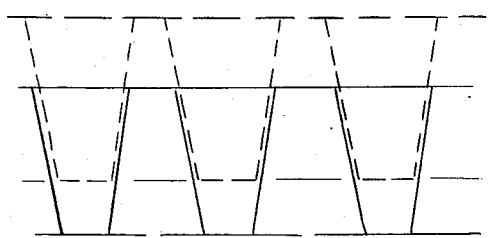
Figure 26:
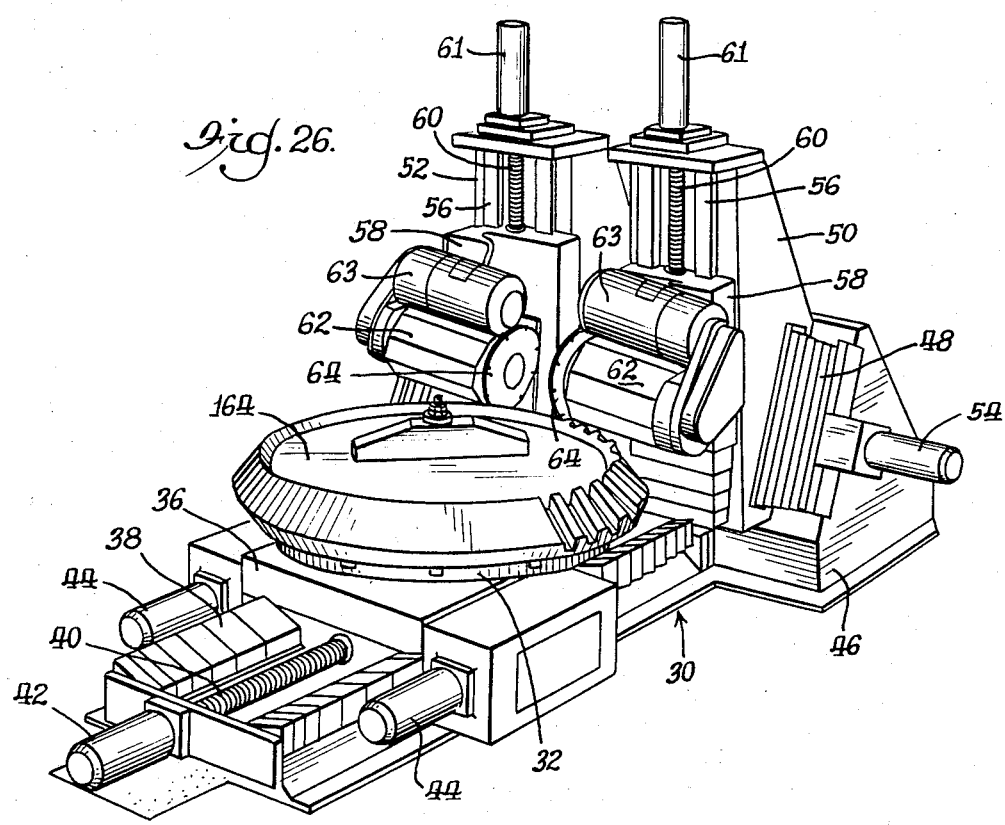
Figure 27:
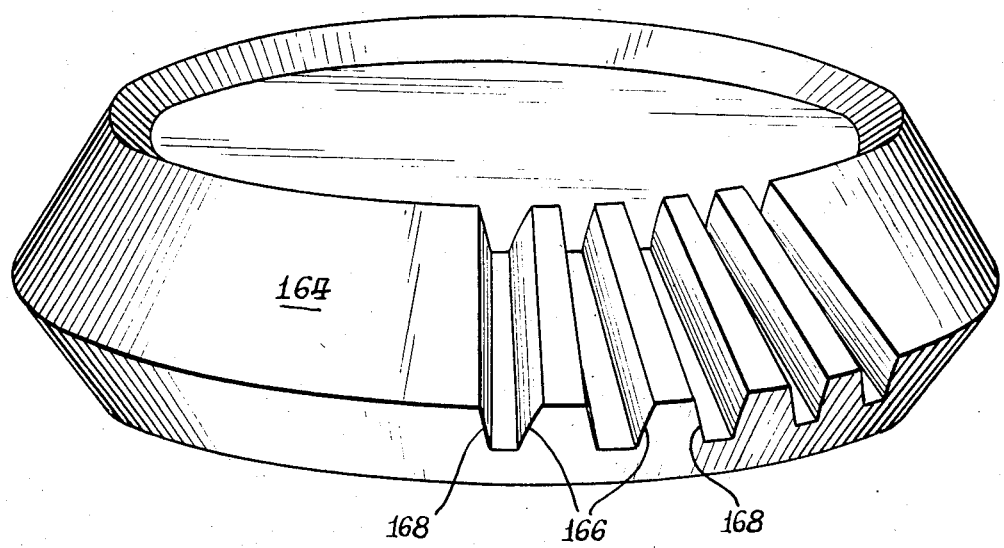

FIGS. 11($a$) and 11($b$) are views similar to FIGS. 7 and 8 showing in schematic form the simultaneous milling of two tooth flanks on a twin-head machine such as that of FIG. 1 and FIG. 2;

FIG. 12 is a diagram of the relative placement of the profile generating lines of two complementary plane cutters for the simultaneous generation of two tooth profiles, straight or helical, for a cylindrical gear;

FIG. 13 is a similar diagram of the placement of complementary plane cutters in the circular plane of action of a bevel gear for the simultaneous generation of two tooth profiles on the machine of FIG. 1 modified as in FIG. 2 for 9-axis operation;

FIGS. 14($a$-$d$), 15($a$-$d$), 16($a$-$d$), and 17($a$-$d$), respectively, are diagrammatic illustrations of plane, conical, and cylindrical cutters and their placement relative to the plane of action of the gear for the practice of the invention, and also showing diagrammatically the complementary forms of cutter of each type for milling opposite tooth flanks;

FIGS. 18($a$-$f$) illustrate forms of unmodified straight and helical involute tooth profiles cut with the plane milling cutter of FIG. 14;

FIGS. 19($a$-$f$) inclusive illustrate the curved tooth forms cut by the complementary milling cutters of any of FIGS. 15 through 17;

FIG. 20 illustrates the asymmetric or "buttress" teeth which the method of the invention is capable of cutting;

FIG. 21 is a cross-section of an involute tooth with its engaging tips relieved in an outline involute to a smaller base circle;

FIG. 22 is a cross-sectional view of an involute tooth undercut in anticipation of a subsequent milling or grinding operation after hardening;

FIG. 23 is a fragmentary plan view of an axially crowned involute tooth made by the method of the invention;

FIG. 24 is a similar fragmentary view of meshing curved gear teeth of different curvature produced by the method of the invention;

FIG. 25 is a similar fragmentary and diagrammatic view of a pair of meshing gears with their teeth tapered oppositely for backlash control;

FIG. 26 is similar to FIG. 1 but illustrates the cutting of a bevel gear with only one of two machine heads, using the method of the invention in one of its modifications;

FIG. 27 is a perspective view of the gear blank of FIG. 26 at an intermediate stage of generation; and FIGS. 28.1 to 28.8 inclusive are diagrams illustrating the analytic geometry of involute generation of conical gears, including generation on the machine shown in FIG. 26, utilizing five of the eight axes.

FIGS. 29.1 to 29.4, inclusive, are diagrams illustrating the applicability of the method of the invention to the generation of the tooth profiles of hyperboloidal gears.

EQUIPMENT FOR PRACTICE OF THE INVENTION

A machine 30 especially adapted for the utilization of the method of the invention to cut very large gears, and particularly for cutting two opposing tooth profiles at the same time, is shown in FIG. 1. It includes a rotary work table 32 for supporting the gear blank 34 for rotation about a vertical axis on a carriage 36 which is movable horizontally on covered ways 38 and positioned therealong by a ball screw 40 turned by a servo motor 42 at one end of the ways. The work table is driven from its underside by gear connections (not shown) to a pair of opposing servo motors 44 mounted on the carriage sides.

The underframing of the covered table carriage ways 38 is joined to a cross frame 46 of triangular cross-section whose sloping side facing the table carriage is similarly provided with covered ways 48 upon which two machine-head columns 50 and 52 are mounted for movement transversely of the table carriage ways, each column being positioned along its supporting ways by a separate ball screw, not shown, similar to that which positions the work table carriage, and each screw is turned by its own servo motor, of which only the motor 54 for the near column 50 of FIG. 1 is shown.

Vertically movable on each of the machine head columns on rails or ways 56 thereon are machine-head slides 58 positioned at the desired height by ball screws 60 each driven by a servo motor 61. Each slide 58 in turn carries on its front face a cutter head 62 with self-contained variable speed spindle drive motor 63. The cutter head is pivotable as a body through at least a limited arc about an axis perpendicular to the front face of the slide, i.e., extending horizontally forwardly as seen in FIG. 1, parallel to the ways 38 on which the work table carriage is movable. The cutter head is pivoted about that axis by a servo motor (not shown) housed within the slide 58 and driving a pinion engaged without backlash with a gear segment integral with the cutter head. The pivot axis of each cutter head 62 is preferably positioned to lie in the cutting plane of its cutter 64 at its center of rotation, i.e., to pass through the spindle axis.

The cutter heads 62 are constructed as mirror images so that the plane cutters 64 mounted on their respective spindles face each other and can be placed in reasonably close juxtaposition for simultaneously cutting the same gear blank. The machine 30 is so constructed that the axes of the spindles of both cutter heads 62 are always positioned in a common vertical plane, notwithstanding that each cutter head is separately rotatable upon its own vertically movable slide 58, each machine head slide is separately vertically movable on its own ways 56, and the columns 50 are separately movable horizontally on their common ways 48.

The two cutters 64, in facing relation to one another when mounted in their respective spindles, are of similar construction but of opposite "hand" so that their operative segments can be rotated downwardly through the gear blank to deposit their chips below.

The arrangement of FIG. 1 will thus be seen to embody five axes of relative movement between each cutter 64 and the gear blank 34, namely, the three axes of mutually perpendicular linear movement represented by the movement of the work table carriage 36 on its ways 38, the transverse movement of each cutting head column 50 and 52 on the ways 48, and the vertical movement of each cutter head slide 58, and two axes of relative rotational movement represented by the vertical rotational axis of the work table 32 and the horizontal axes of rotation of the individual cutter heads 62 on the slides 58. As the work table translation and rotation enter into each 5-axis relationship between cutter and work piece, the machine actually embodies only eight, rather than ten, axes of movement. Movement along or about each of those axes is controlled by a separate servo motor or motors under the overall control of a computerized numerical control, not shown.

As each cutter head 62 incorporates its own spindle drive motor 63, and all movement on or along the five axes of motion of the gear blank relative to each cutter are independently powered and controlled, the cutting speeds of the cutters 64 may be chosen at will for optimum cutting performance and finish as they are independent of the involute generating movement.

It will be apparent from later explanation of the cutting method of the invention that the method can be carried out on a 5-axis machine of greater or lesser proportion, and to a limited extent, i.e., for cylindrical spur gears only, on a 4-axis machine, typically one in which only the gear blank is rotatable.

FIG. 2 shows schematically a modification of the machine of FIG. 1 in which the work table carriage 36' is constructed in two parts, namely a cradle 66 which is tiltable toward the aforementioned common vertical plane of rotation of the spindle axes, and a supporting frame 68, positionable, like the carriage 36 of FIG. 1, along the ways 38'. The cradle 66 carries the rotary work table 32' and its servo motors 44'. The tilt axis of the cradle is defined by transversely extending trunnions 70 journalled in bearings in the supporting frame 68, while the cradle 66 itself is variably tiltable and maintained in tilted position by a motor-driven pinion 72 and segmental gear 74 secured to the cradle. The placement of the cradle trunnions well forwardly of the center of gravity of the cradle and gear blank assures the maintenance of a substantial moment opposing that of the cutting forces to assure the rigid support of the gear blank being machined.

The preferred form of plane cutter 64 shown in FIGS. 3 and 4 includes several sets of indexable cutting inserts 76 spaced angularly about both faces of the cutter body, and each positioned in a pocket 78 located to place the cutting edge of the insert adjacent the trailing side of a generally radial chip channel 80. The inserts 76 are preferably of the so-called "on edge" type similar to the inserts of FIG. 9 of Erkfritz U.S. Pat. No. 3,708,843.

The forward face 82 of the cutter body lies in a plane perpendicular to the axis of rotation of the cutter, and the rear face 84 of the cutter body is conical. In both faces of the cutter body, the inserts 76 are spaced radially alongside successive chip channels so that their respective cutting edges sweep overlapping paths to generate a continuous cutting path, conical on the back side of the cutter, and an annular plane on the front side of the cutter perpendicular to the axis of rotation.

Referring to FIG. 4, it will be seen that the radially outermost inserts of both the front and rear faces of the cutter sweep paths which overlap at their tips to form a plunge-cutting rim 86 which is relieved by a slight radius at the tip of each radially outermost cutter insert, the radius 88 at the corner of the outermost cutting insert of the front face 82 being later reflected in the gear as the root fillet of the tooth.

As indicated, the form of cutter shown in FIGS. 3 and 4 is the preferred form of plane cutter, because the buttress cross section of the outer supporting rim of the cutter body is sturdy, and sufficiently large to permit the use of indexable and replaceable inserts, while the angle included between the two cutting faces, preferably about 25° to 30°, is not sufficiently great to interfere with the facing profile of the adjacent tooth.

As will later be seen, the plunge-cutting rim 86 and conical back face 84 of the cutter perform the rough cutting and incur the greater wear, whereas the plane front face 82 removes considerably less metal in forming the involute profile, in what is thus essentially a finishing operation.

Where gear tooth size is too small to permit the use of a cutter with indexable inserts, the cutting inserts are brazed onto the cutter body, and sharpened, as required, in the conventional way.

GENERATING THE INVOLUTE TOOTH PROFILE

The basic principle of the generation of a tooth profile which is involute from a right surface of revolution is illustrated diagrammatically in FIGS. 5 and 6 for the predominant cases of the right circular cone and right circular cylinder. Both diagrams also serve to illustrate the method of the invention for cutting involute gear teeth with a plane cutter.

a. Conical Generation, The General Case, FIG. 5

FIG. 5 illustrates in broken line a cone 90, referred to in gear terminology as "the base cone", resting upon a plane 92, called the "plane of action", upon which it may roll in a circular path about an axis 94 perpendicular to the plane of action at the apex of the cone.

The radius of the circular path is the same as the cone distance of the base cone, i.e., the length of its generating element, which is also the length of the line of tangency of the base cone with the plane of action. It may be convenient, therefore, to think and speak of the plane of action 92 as circular for it is only the circular portion of that plane, i.e., the circular locus of the line of tangency of the rolling base cone, with which we are concerned.

Insofar as the gear blank itself is concerned, we may further focus attention on the intercept of the base cone by the conical gear blank 96, i.e., the frustrum of the base cone between its base circle and the lesser circle which defines the opposite and parallel face of the base cone intercepted by the gear blank. That frustrum of the base cone rolls in a circular path delineated by the circle 98 which circumscribes the plane of action and by an inner concentric circle 100.

As the base cone rolls over the plane of action, any point such as point 102 in the plane traces a path 104 away from the surface of the base cone to which it was momentarily tangent. The path 104 is involute to the surface of the cone at the location of the separation of the point 102 in the plane of action therefrom, as though from a circle of equal rolling radius, namely a circle perpendicular to the plane of action having a radius measured perpendicularly to the plane of action, from the given point of tangency, to the axis of the cone. That radius is termed a "transverse radius" and is equal to the cone radius to the point 102 when it was tangent to the cone divided by the cosine of the cone angle. In FIG. 5, the base circle radius of the base cone is labelled R and the transverse radius at the base of the base cone is labelled $R_T$.

Conversely, if the rolling movement of the base cone on the plane of action is stopped and then reversed, the given point 102 in the plane of action retraces the same involute path 104 back to the surface of the base cone 90 as the latter rolls back to its starting location, i.e., again to include the point 102 within the line of tangency of the base cone.

It may be appreciated that inasmuch as the rolling base cone 90 is constantly changing direction as it rolls upon the plane of action, the trace 104 of the given point is a 3-dimensional curve in space, as distinguished from the usual concept of a plane curve involute from or to a circle in a plane.

If instead of the single point 102 considered above, all of the points in the plane of action which lie in a line 106 in the plane are considered simultaneously, the path traced by that line in its movement away from the rolling base cone is a surface 108 which is the envelope of the individual 3-dimensional involute traces of all points on the given line 106 in the plane. The line 106 in the plane of action may accordingly be called the "generating line".

If the generating line is straight, and if it is disposed radially in the plane of action, viz., the line 106 of FIG. 5, it will coincide with an instantaneous line of tangency of the rolling base cone with the plane of action. The development of the involute traces of all points on the generating line 106 accordingly proceeds simultaneously as a surface which for convenience is here termed an "involute surface". All straight lines in the resulting surface pass through the apex of the base cone.

If the generating line is straight but skewed from radial alignment in the plane of action, e.g., the generating line 110 of FIG. 5, the incremental involute traces of successive points along the line are generated progressively, exactly as though the generating line 110 were a conical helix being unwrapped from the surface of the base cone. Similarly, if the generating line is curved, the progression of the generation of the involute traces by the individual points on the generating line is governed by the slope of the curve. In all cases, the resulting surface is the envelope of the individual involute traces of all points on the generating line, and for convenience, that surface is referred to as "involute" from or to the base cone.

If, then, the plane of action were reduced to the two broken lines 98 and 100 considered as rails, and the base cone 90 were imagined to extend axially beyond the rails and to have a concentric outer frusto-conical layer between the circular rails, and if the generating lines 106 and 110 were thought to be taut wires stretched between the circular rails and capable of cutting the concentric outer layer (gear blank 96), and if the base cone 90 were visualized as rolling from left to right to the position shown, the wire 106 would cut an involute surface 107 (a left-hand tooth profile) through the outer layer from its periphery (addendum) down to the base cone 90. As the base cone continued to roll, the same wire 106 would cut another and complementary involute surface 108' (a right-hand profile) in the outer layer as the beginning portion of the extended involute sheet 108 shown in FIG. 5. The net effect would be to carve a cusp-like groove into the frusto-conical outer layer, the walls of which are complementary involute surfaces.

Similarly, the wire 110 would first cut the helical involute surface 111 down to the surface of the base cone 90 and then the complementary opposing surface 112' as the beginning of the more extended involute sheet 112.

This, in effect, is how the involute profiles of gear teeth are generated by the method of the invention, although with the facing involute profiles 107 and 108', or 111 and 112', machined separately and separated peripherally to provide the desired tooth thickness, and by effecting a relative rolling movement of the base cone with respect to the plane of action.

As it is inherent to the geometry of involute generation that each elemental involute curve of what has here been termed an involute surface is perpendicular to the plane of action at its intersection with that plane, the imaginary taut wires 106 and 110 of the foregoing illustration are replaceable with the rotary cutter 64 whose cutting edges sweep a circular cutting plane perpendicular to the plane of action. The cutter axis 116 is positioned below and parallel to the plane of action, with an arc segment of the cutting plane protruding through the plane of action so that the chord 118 along which the cutting plane intersects the plane of action is substituted for the taut-wire cutter, i.e., becomes the generating line.

Still referring to FIG. 5, the rotary plane cutter 64 is illustrated at its point of maximum penetration, i.e., with the rim of the cutter arc which is above the plane of action plunged to the maximum desired depth in the gear blank 96, viz., to a depth coincident with the desired root or dedendum depth of the gear tooth. The near face of the cutter 64, as shown diagrammatically in FIG. 5, is the active generating face, and the chordal intersection of that face with the plane of action is the generating line 118. As illustrated, the cutter plane is disposed radially of the plane of action, i.e., transverse to the rolling path of the base cone.

To cut successive profiles 114 of straight teeth in a conical or bevel gear, as illustrated in FIG. 5, the cutter 64 is re-positioned successively along the circular path with its generating line 118 moved successively to positions separated from each other by the plane-of-action angular equivalent of the transverse base pitch angle of the gear.

To cut a helical tooth profile of either right- or left-hand helix, the cutter plane of the cutter 64 is turned on an axis perpendicular to the plane of action so that its resulting generating lines 118' and 118" are askew from radial in the plane of action. It will also be apparent that when the cutter is so turned, its new generating lines 118' and 118" (being straight lines in the illustrated case) would make different angles with the line of tangency of the base cone at every point of their sequential intersection, making a larger angle at the lesser rolling radius than at the greater. Although the helix angle is accordingly variable, notwithstanding the fixed position of the generating line in the plane of action, the position of the generating line may nevertheless be specified by specifying the radius of a circle 120 about the axis 94 by the plane of action to which the generating lines 118' and 118" are tangent, a circle which may be termed the "base helix base circle".

When generating the tooth profiles of a bevel gear by the method of the invention using the modified machine of FIG. 2, the axis of the bevel gear blank 96 and of the imaginary base cone included within it is tilted toward the vertical plane of the spindle axes until an element of the base cone is vertical, i.e., parallel to the plane of the spindle axes. The carriage 36' is then advanced toward the operating zone of the rotating cutters 64 until the imaginary plane of action, tangent to the vertical element of the imaginary base cone, is penetrated by each rotating cutter to the desired depth.

The principles of involute generation illustrated in FIG. 5 are applied by effecting a relative rolling motion between the imaginary base cone and the imaginary tangent and vertical plane of action, that is, by rotating the gear blank about its own axis and rotating the imaginary plane of action about its axis at an angular velocity ratio such as to synthesize the rolling motion of the base cone on the plane of action without slippage. What this amounts to is swinging the cutters in a vertical plane as though fixed in the rotating plane of action, until the generating line of the cutter has traversed the gear blank between the outer or addendum surface thereof and a depth of penetration such as to have generated the involute profile down to the desired depth, at least to the so-called "start of active profile", i.e., the point on the profile at which contact by the meshing gear tooth ceases.

In the machine of FIG. 2, the swing of the cutters 64 on any radius is accomplished by the simultaneous translation of the cutters horizontally and vertically in the transverse vertical plane of their axes, and by the pivoting of the cutter heads to maintain the constant angularity of their generating lines with the plane-of-action radii through their centers.

The same relative generating movement can also be accomplished for the generation of one conical tooth profile at a time using the machine of FIG. 1, as shown in FIG. 26, i.e., with a 5-axis relationship between the cutter 64 and the gear blank 164, as will be explained later herein.

b. Cylindrical Generation, The Special Case

Although external cylindrical gears may predominate numerically, the generation of involute tooth profiles of cylindrical gears is essentially one of two limits of the general or conical case, of which the crown gear, or circular rack, is the other.

The cylindrical case is approached as a limit when the apex angle of the base cone becomes smaller and smaller, and its circular path of rolling movement upon the plane of action commensurately larger, until the apex angle is zero, the base surface cylindrical, and the path of rolling movement of the base surface is a straight path. The opposite limit, the crown gear, is approached as the apex angle of the base cone becomes larger and larger until the surface of the base cone merges into the plane of action.

Cylindrical generation of involute tooth profiles is illustrated diagrammatically in FIG. 6, comparably with the illustration of conical generation in FIG. 5.

The base cylinder 120, shown in broken lines, rests upon the plane of action 124 upon which it may roll in the straight path defined by the broken lines 126. As the base cylinder rolls over the plane, any point 128 in the plane which is momentarily tangent to the base cylinder traces an involute path 130 away from the surface of the cylinder as the rolling movement proceeds, and retraces the same path if the rolling movement is reversed in direction. The involute curve 130 is, however, a plane curve because the cylinder rolls in a straight path rather than in the circular path of the general or conical case.

A straight generating line 132 in the plane of action disposed transversely of the path of the rolling base cylinder 120 parallel with the line of tangency of the cylinder with the plane of action will accordingly first cut the involute surface 133 in the concentric outer layer 121 and then the complementary involute surface 134' therein as the beginning of the more extended involute sheet 134 representing the envelope of the involute traces of all points in the generating line. Because the base surface is a cylinder, all straight lines of the involute surfaces are parallel to the axis of the cylinder and to its line of tangency with the plane of action.

If the generating line in the plane of action be disposed transversely of the cylinder path but askew from parallelism with the line of tangency of the base cylinder with the plane, e.g., the line 136, the development of the complementary involute surfaces 137 and 138' in the outer layer 121 as the base cylinder rolls proceeds progressively rather than simultaneously. The progressive trace of the generating line upon the surface of the base cylinder 120, i.e., the line at the bottom of the cusp-like groove defined by the surfaces 137 and 138', is a helix having a base helix angle measured by the angular divergence of the generating line 136 from parallelism with the line of tangency.

FIG. 6 similarly shows the plane cutter 64 with its axis 116 disposed below the plane of action 124 upon which the base cylinder 120 is presumed to roll, with an arc segment protruding upwardly through the plane of action to penetrate the gear blank to the desired depth either at the commencement or at the termination of the profile generating movement, as will later be explained. The intersection of the plane face of the cutter 64 with the plane of action provides the generating line 118, as in the conical case. With the direction of rolling movement as depicted in the diagrammatic illustration of FIG. 6, the tooth profile 114 engaged with the forward plane face of the cutter is shown at the completion of generation ready for withdrawal of the cutter.

Just as in the conical case, successive tooth profiles 114 are generated by indexing the cutter 64 along the rolling path of the base cylinder by one "transverse base pitch", i.e., the circumference of the base cylinder divided by the number of teeth of the gear.

For the cutting of a helical cylindrical gear, the cutter plane, while maintained perpendicular to the plane of action, is turned one way or the other to the desired helix angle away from parallelism with the line of tangency of the base cylinder, to cut helical teeth of either left- or right-hand helix.

In the machine of FIG. 1, the principles of involute generation illustrated in FIG. 6 are applied by effecting a relative rolling motion between the imaginary base cylinder of the cylindrical gear blank 34 which is disposed horizontally for rotation about a vertical axis, and an imaginary vertical plane of action which is penetrated by the two plane cutters 64 in the manner described in connection with the diagrammatic showing of FIG. 6. This relationship is accomplished by advancing the carriage 36 toward the operating zone of the rotating cutters 64 until the imaginary plane of action tangent to the imaginary base cylinder is penetrated by each rotating cutter to the desired depth.

c. The Mechanics of Generation

The progressive generation of the involute tooth profile of a gear using a rotary plane cutter of the preferred type shown in FIGS. 3 and 4 is illustrated diagrammatically in FIGS. 7 and 8. These diagrammatic illustrations may be taken as the "rolled out" development of the back cone of a straight-toothed bevel gear into the plane of the drawing, i.e., the transvese plane, and equally as the cross-section of a straight-tooth cylindrical gear.

Initially assuming operation with only one cutter, that cutter may be positioned as shown in FIG. 7 by the broken line trace of the cutter 64, i.e., at a far left position clear of the addendum surface of the gear blank. When the gear blank is rotated counter-clockwise as seen in FIG. 7, the cutter is advanced simultaneously from left to right at a lineal speed equal to the peripheral speed of the imaginary base surface, thereby to effect a relative rolling movement of the base surface from right to left upon the plane of action. In that process, i.e., as the cutter plane 82 advances toward the line of tangency of the base surface with the plane of action, the face of the cutter perpendicular to the plane of action generates the involute tooth profile 114a, as is shown incrementally by the succession of views of FIG. 7.

FIG. 8 illustrates how the same generating movement can be accomplished in reverse, i.e., by first plunging the cutter 64 to the desired depth, and then by rotating the gear blank in the opposite direction and similarly reversing the feeding direction of the cutter to retrace the same involute path.

In either feeding direction, the greater part of the material removed to create the tooth space is removed by the cutting edges of the plunging rim 86 and by the cutting edges on the conical back face 84 of the cutter. The front plane face 82 of the cutter, in contrast, removes only the relatively small amount of material in the open, wedge-shaped space between the cutter and the involute surface 114a generated (far right-hand view of FIG. 7), enabling the cutter to produce a good finish on the tooth surface while the plunging rim and the back face of the rigid cutter are roughing out metal to form the tooth space.

The limit of the movement of the perpendicular cutter plane toward the line of tangency is a matter of choice. If the plane face 82 of the cutter in FIGS. 7, 8, and 10 were traversed to coincide with the line of tangency of the base surface, the involute profile would be generated fully to the base surface, i.e., the cutter plane 82 would be on the center line of the gear blank. Any further rolling motion would cause the cutter rim to undercut the tooth profile inwardly of the base surface, but this may be done deliberately where an undercut tooth is desired.

Actually, as gear designers will understand, it is not necessary to generate the involute profile to a depth greater than the so-called "start of active profile", which is the point on the profile at which contact is made with the tip of the tooth of the meshing gear. An additional margin of involute profile below the designed "start of active profile" may be desirable to allow for center distance tolerances, but further involute generation is unnecessary.

Inasmuch as the cutter segment which extends through the plane of action produces the clearance space for the tip of the meshing tooth, the depth of penetration of the plane of action by a given cutter determines the maximum depth of penetration of the gear blank by the cutter. It also determines the length of the generating line of any given cutter, and thus the number of passes necessary to cut a tooth profile of given face width.

Figure 9:
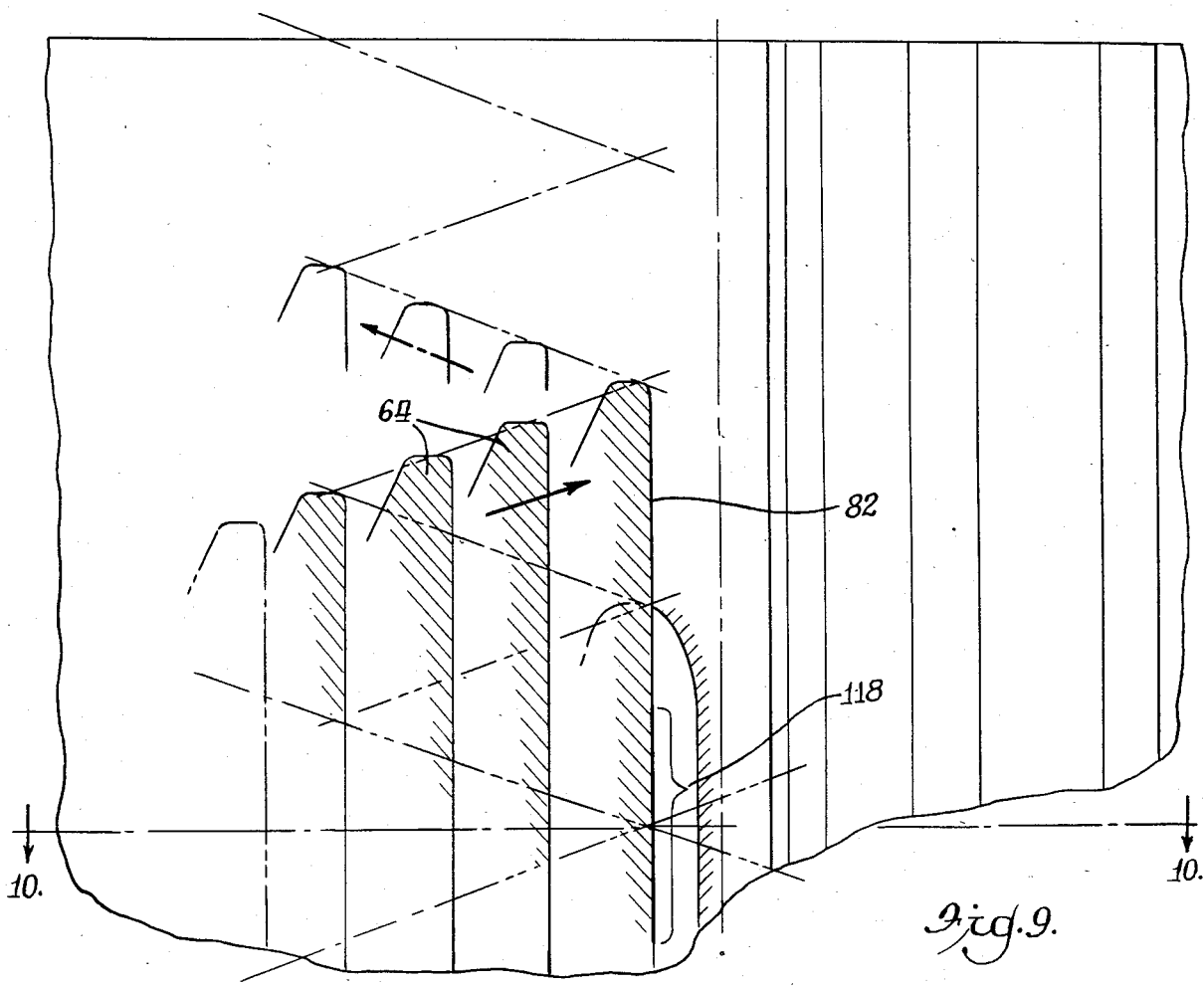
FIG. 9 is a fragmentary elevational view of the face of a cylindrical spur gear positioned as it would be in the machine of FIG. 1, showing the plane cutter of FIG. 4 in schematic form and diagramming its path of movement in generating the involute tooth profile of a gear of substantial face width.

That is to say, where, contrary to the diagrammatic illustration of FIGS. 5 and 6, the chordal generating line 118 is not long enough to generate a tooth profile of the desired face width in a single generating pass, the cutter may be moved laterally of the rolling path of the base surface for a second and as many further generating passes as are necessary to extend the tooth profile to the entire face width of the gear. As shown in FIG. 9 for the cylindrical case, this is preferably done continuously, i.e., with a continuous component of axial feeding movement of the cutter to translate its generating line 118 in extension of itself while generating the profile by first rolling the base cylinder in one direction (FIG. 7) until the generating line traverses the gear blank from the addendum surface to the desired depth of active tooth profile, and then reversing the rolling movement (FIG. 8) to withdraw the cutter from the blank along the same path projected. This sequence is repeated while the cutter is fed axially of the gear blank, the resulting composite movement tracing a zig-zag path across the face of the gear (FIG. 9).

When the tooth profile generation is completed across the face width of the gear blank in multiple zig-zag passes as shown in FIG. 9, the bottom of the tooth space is characterized by a series of cusps and scallops, which may be removed in a concluding axial slotting pass of the cutter, combined with suitable rotation of the gear blank in the case of helical gears to provide the required root helix.

Figure 10:
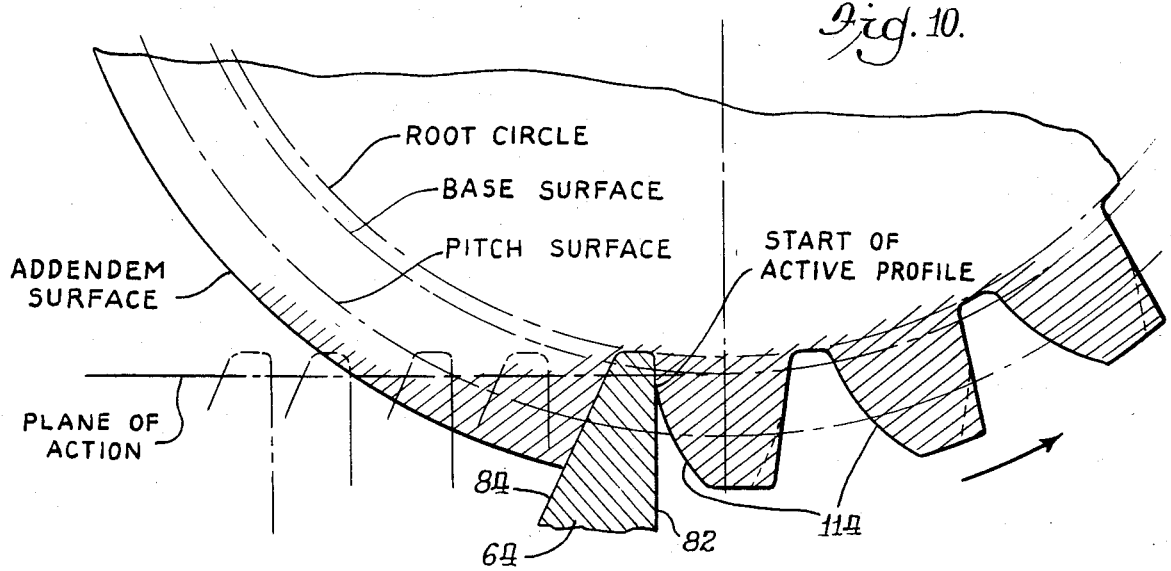
FIG. 10 is a fragmentary cross-sectional view taken on the line 10—10 of FIG. 9.

The opposite tooth profile, shown in broken line in FIG. 10, is cut by the same method, with the plane cutter, preferably a complementary cutter of opposite hand, facing in the opposite direction and traversing a feeding path disposed symmetrically (for symmetric teeth) on the opposite side of the line of tangency of the base cylinder with the plane of action.

Whether the opposite tooth profiles are cut subsequently or simultaneously as later explained, the gear blank is indexed by one pitch angle for the cutting of each successive profile, and the cutting planes of the opposing cutters are separated by a distance which is the sum of the transverse base thickness of the tooth, i.e., tooth thickness measured along the involute intercept by the base surface, and any convenient integer multiple of the transverse base pitch.

TWO-CUTTER GENERATION

It will be appreciated from the foregoing explanation that multiple cutters may be employed to operate upon the same gear blank if they are disposed at appropriate intervals along the rolling path of the base surface on the same plane of action so as to intercept the gear blank sequentially as its imaginary base surface rolls upon that plane of action. Moreover, when a relative rolling movement of the base surface upon a plane of action is effected, as in the machine of FIG. 1 for cylindrical gears, or as modified by FIG. 2 for bevel gears, by a rotation of the gear blank in place about its own axis and a transverse movement of the generating lines of the cutters tangentially of the base surface of the gear blank, it would similarly be possible to so position multiple cutters for transverse feeding movement, each with its own plane of action tangent to the base surface, and intersecting the plane or planes of the other cutters.

Practically, however, multiple cutters are employed in pairs in the same plane of action with their cutting planes facing each other, i.e., in opposite directions of rotation of the gear blank.

Figure 11A:
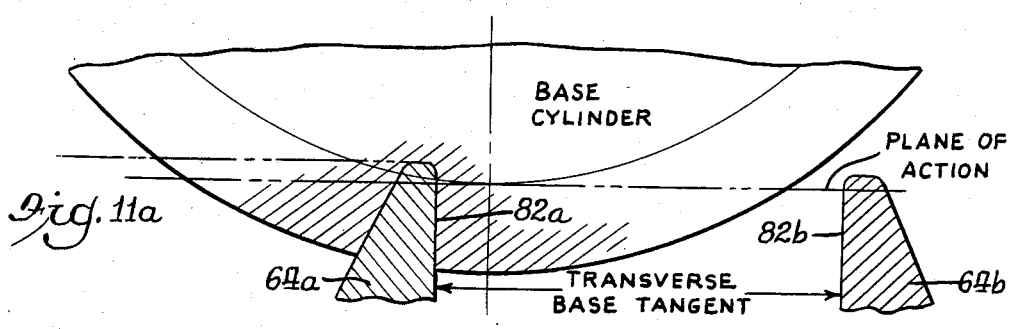
Figure 11B:
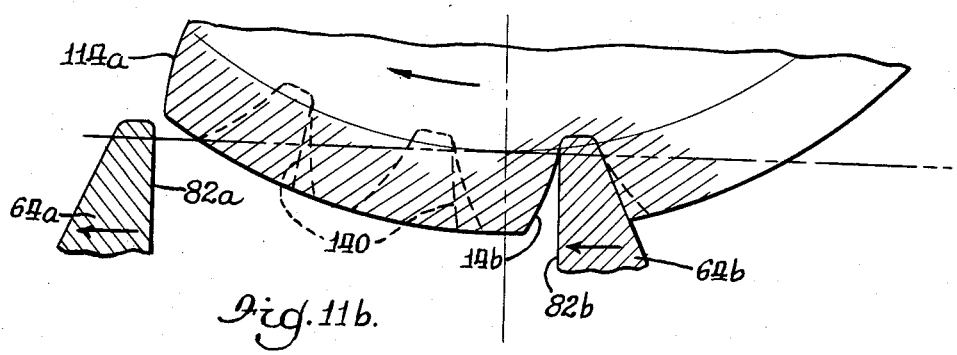

FIGS. 11(a) and (b) illustrate the simple case of two plane cutters 64a and 64b disposed in facing relation so as to cut the opposite flanks of different teeth of a gear at the same time in a single transverse feeding pass. As shown in FIG. 11(b), this requires that the cutting planes 82a and 82b be spaced apart at the proper distance, which is to say that they must be spaced a distance which is equal to an integer multiple of the transverse base pitch plus the transverse thickness of the gear tooth measured along its intercept by the base surface. This distance has been termed a "transverse base tangent".

To generate a pair of opposing tooth profiles, such as those of FIG. 11(b), completely in any given gear, the integer multiple of the transverse base pitch, and thus the value of the transverse base tangent, is chosen so that when one cutter is at its innermost position, e.g., right-hand cutter of FIG. 11(b), the other cutter is clear of the opposite profile 114a. While time and space considerations make it preferable that the transverse feeding movement of the two cutters be held to a minimum, the integer multiple may be increased arbitrarily beyond the minimum multiple, if, for example, the distance between the cutter faces has a minimum limit which requires a larger multiple.

In FIG. 11(a), the gear blank has been advanced toward the cutters so as to have plunged the left-hand cutter into the gear blank to the desired depth while the right-hand cutter stands clear of the work piece. As the gear blank is rotated clockwise from the position of FIG. 11(a) to the position of FIG. 11(b), both cutters are simultaneously fed transversely from right to left at the base-surface peripheral speed until the left-hand cutter 64a, standing clear of the periphery of the gear blank in FIG. 11(b), has generated the involute profile 114a while the right-hand cutter 64b has generated a similar, but complementary, involute profile 114b of the tooth two pitches removed.

It will be understood, moreover, that as the feeding direction of the cutters is reversed for cutting a tooth of face width exceeding the length of the generating lines, the direction of rotation of the gear blank is also reversed, as explained in connection with FIGS. 7 and 8.

In roughing out the bulk of the tooth space, the back side of each cutter leaves a conical surface opposing the involute surface generated by its plane front face, or a series of conical surfaces if the cutters are simultaneously fed axially of the gear face during the generating movement, as in FIG. 9. Such opposing surface at its maximum penetration is indicated by the straight dotted lines 140 in FIG. 11(b), which similarly indicate the relatively small amount of remaining tooth-space material to be cleaned out by the left-hand cutter when the cutters are subsequently withdrawn and the gear blank indexed through one circular pitch for the subsequent generating operation.

FIGS. 12 and 13 illustrate diagrammatically in plan views of the planes of action the positions and spacing of the generating lines of the complementary cutters of FIGS. 11(a) and 11(b) for the cylindrical and conical or bevel gear cases, respectively, and for face widths which exceed the lengths of the generating lines of the two complementary plane cutters. Inasmuch as the cutter heads of the machine of FIG. 1 are pivotable on axes through the centers of their cutting planes, the generating lines of the cutters positioned for straight teeth and for helical teeth of either hand are shown as intersecting in a common point for both the cylindrical case of FIG. 12 and the conical case of FIG. 13. Those common points are spaced apart in the cylindrical case by the minimum transverse base tangent, viz., as illustrated in FIG. 11 by two transverse base pitches plus one transverse base tooth thickness, and are spaced apart in the bevel gear case of FIG. 13 by a transverse base tangent angle in the circular plane of action which is the equivalent of an integral number of angular pitches plus the angular thickness of one tooth.

ALTERNATIVE FORMS OF CUTTER FOR CURVED GENERATING LINES

FIGS. 15 to 17 inclusive illustrate collectively and diagrammatically several forms of cutters suited to the production of axially curved teeth by the method of the invention. They are there displayed for convenient orientation by reference to the general purpose plane cutter 64 of FIGS. 3 and 4, which is shown diagrammatically in FIG. 14.

FIGS. 14(c) and (d) illustrate diagrammatically a pair of plane cutters 64a and 64b which are complementary in the sense that their cutting edges are disposed to cut in opposite directions of rotation. This is the preferred arrangement for simultaneous cutting by two cutters, as in FIG. 1, where, as earlier explained, the engaged segments of both cutters cut downwardly through the gear blank, and the feed of the cutters axially of the gear blank is upward so as to clear the chips downwardly through the tooth space already cut. FIG. 14(a) shows in solid line the segment of the cutter 64 which protrudes through the plane of action, whereas FIG. 14(b) shows the same cutter endwise in elevation and in relation to the plane of action.

FIG. 15 illustrates a conical cutter 142 which intersects the plane of action in a hyperbolic generating arc 144, the cone angle being quite large, while FIG. 15(b)

shows the rotational axis of the cutter angled with respect to the plane of action to the extent necessary to position the conical cutting path perpendicular to the plane of action at the center of the generating line 144.

It will be recalled from the foregoing explanation of the geometry of involute generation that the involute curve requires that the cutter be perpendicular to the plane of action in order to be tangent to an involute from the base surface. Therefore, when employing a cutter of the kind illustrated in FIG. 15, a true involute is generated only at the center of the generating line 144, i.e., by that element of the conical surface which is perpendicular to the plane of action. On either side of that perpendicular, the cone elements deviate progressively from the perpendicular and the curve which they generate is accordingly modified from truly involute but tolerable if kept within the limits of involute distortion normally to be expected from tooth deflection under load.

Cutters which are complementary in form are required, the cutter 142a of FIG. 15(c) having its involute-generating cutting edges on the inside of the cone to cut the axially convex profiles of the teeth, while the cutter 142b of FIG. 15(d) has its generating cutting edges on the outside of a cone preferably of identical dimension to cut the axially concave opposing sides of the teeth.

FIG. 16 illustrates a conical cutter 146 having a much reduced cone angle so as to intercept the plane of action with the elliptical generating arc 148 seen in FIG. 16(a). FIG. 16(b) illustrates that the element of the conical cutting surface in the center of the elliptical arc 148 of FIG. 16(a) is perpendicular to the plane of action, with progressive deviation from perpendicularity along the generating line in both directions from center. The complementary forms are shown in FIGS. 16(c) and (d), the cutter 146a of FIG. 16(c) having its generating cutting edges on the inside of the cone, and the cutter 146b of FIG. (d) having its generating cutting edges on the outside.

In similar fashion, FIGS. 17(a) and 17(b) illustrate the circular arc generating line 152 of a cylindrical cutter 150 intercepted by the indicated face width of the gear, and penetrating the plane of action with its rotational axis perpendicular to the plane of action. FIG. 17(c) illustrates such a cutter 150a with its generating cutting edges on the inside of the cylinder for generating the convex involute surfaces of axially circular teeth, while FIG. 17(d) illustrates the complementary cutter 150b with its involute-generating cutting edges on the outside, to sweep a cylindrical generating path for cutting the concave profiles.

When machining curved teeth, it is necessary that the radii of curvature at the midpoint of the generating arcs 144, 148, and 152 of cutters 142a, 146a, and 150a not be greater than those produced by the complementary cutters 142b, 146b, and 150b, respectively. Failure to observe this requirement will result in teeth which will touch only at their ends.

Inasmuch as the cutter axes, i.e., spindle axes, are parallel to the plane of action in the machine form of FIG. 1 and in its modification of FIG. 2, it will be apparent that modification of the cutter heads 62 of the machine, or of their mountings, would be necessary for the use of conical or cylindrical cutters to place the spindle axes in the required relation to the plane of action illustrated in FIGS. 15(b), 16(b), and 17(b), one candidate being the nutatable-spindle machine head of my colleague, Keith Goode, illustrated in U.S. Pat. No. 4,370,080.

The manifold tooth forms of which the plane cutter 64 is capable when used in the method of the invention are shown in FIG. 18. FIG. 18(a) illustrates a straight spur gear, while FIGS. 18(b) and (c) illustrate helical cylindrical gears of right- and left-hand helix respectively. FIG. 18(d) shows a bevel spur gear, and FIGS. 18(e) and (f) illustrate respectively helical bevel gears of left- and right-hand helix.

The diagrammatic illustrations of FIG. 19 may be taken to illustrate the tooth forms of which the conical and cylindrical cutters of FIGS. 15, 16, and 17 are capable. FIG. 19(a) illustrates a cylindrical gear in which the curved teeth are symmetrical about the mid-plane of the blank, i.e., formed by any of the complementary cutters of FIGS. 15 through 17 with the cutter axis in the mid-plane of the gear blank. FIGS. 19(b) and (c) represent curved helical teeth such as would be generated by turning either of the conical cutters 142 or 146 about the axis of its element perpendicular to the plane of action, i.e., rotating the generating lines clockwise or counter-clockwise as viewed in FIGS. 15(a) and 16(a). The same diagrammatic illustrations of FIGS. 19(b) and (c) may also be taken to represent curved helical teeth generated by the complementary cylindrical cutters of FIGS. 17(c) and (d), with the rotational axes of the cutters positioned below the mid-plane of the gear blank of FIG. 19(b) and above the mid-plane of the blank of FIG. 19(c).

Figure 19D:
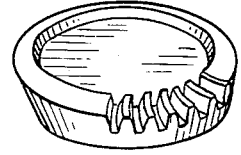
Figure 19E:
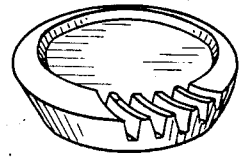

Similarly, the curved teeth of FIG. 19(d) are those generated by the complementary cutters of either of FIGS. 15, 16, or 17, with their generating lines tangent to a radius of the circular plane of action at the centers of the generating lines, whereas the spiral bevel gears shown diagrammatically as left-hand and right-hand spirals in FIGS. 19(e) and (f) are generated by the complementary conical cutters of either FIGS. 15 or 16 turned, as earlier indicated, about their respective elements perpendicular to the plane of action so that they are askew from tangency to a plane-of-action radius at their centers, but instead are tangent at their centers to lines 118' and 118", respectively, of FIG. 5 which are tangent to the base helix base circle 120.

The spiral bevel gears of FIGS. 19(e) and (f) may also be cut by the complementary cylindrical cutters of FIG. 17 by rotating their axes in circular paths in the plane of action at a radius such that the intercept of the circular generating arc is tangent to the tangents 118' and 118" to the base helix base circle 120 (FIG. 5) radially midway between the circles 98 and 100 which delineate the rolling path of the gear blank's intercept of the base cone.

MODIFIED TOOTH FORMS

It can be appreciated from the foregoing explanation of involute profile generation by the method of the invention that a change of the transverse feeding speed of the cutter relative to the rotational speed of the base surface in effect changes the radius of the imaginary base cylinder or the cone angle of the imaginary base cone within the gear blank from which the generated tooth profile is involute. If the transverse feed velocity of the cutters is increased, or if the rotation of the gear blank is slowed, the effect is to increase the radius or cone angle of the base surface to which the tooth profile thereafter generated is involute, which is to say that for a given pitch surface, the pressure angle, i.e., the angle at which a plane tangent to two meshing gears at their pitch points intersects the plane of action, is reduced.

Conversely, if the transverse feed rate of the cutters is reduced, or the rotation of the gear blank speeded up, the effect is to generate a tooth profile involute from a base cylinder of smaller radius, or from a base cone of smaller cone angle, that is, effectively to increase the pressure angle of the gear tooth.

As a result, the method of the invention, whether employing cutters having straight or curved generating lines, can produce gear teeth of different pressure angle on opposite profiles of the same tooth, or indeed in different sections of the same tooth profile.

The former is shown in FIG. 20, which illustrates the design layout of a pair of cylindrical gears of "buttress" or asymmetrical form with a pitch pressure angle of 15° on the meshing tooth profiles 154 and 156 of the meshed gears when driving in the preferred direction indicated by the arrow, and a pressure angle of 25° in the opposite direction. It is understood by gear designers that smaller pressure angles are desirable for the increased tooth-contact ratio which they allow, but undesirable from the standpoint that, in symmetrical teeth, the lower pressure angle results in a narrower base width of the tooth with resulting weakening of the tooth. For those applications in which the gear rotation is predominately unidirectional, the advantage of the low pressure angle, without the disadvantage of the weakened tooth, is obtainable with an asymmetric tooth as indicated in FIG. 20, where the predominant working pressure angle of 15° at the indicated base pitch readily allows a contact ratio of 2, i.e., with two teeth of each gear always in meshing engagement, but with teeth whose bending strength is enhanced by their asymmetric profile.

Asymmetric teeth are readily achieved in the practice of the method of this invention, as earlier explained, by changing the transverse feed rate of the cutters relative to the rotational speed of the gear blank when cutting the opposite profiles. Moreover, opposing tooth flanks of different pressure angle may be cut simultaneously by feeding the two cutters at different rates, taking due care to adjust the feed stroke of the faster traversing cutter to terminate its generating movement simultaneously with that of the slower cutter when the faster moving cutter is generating from the addendum surface inwardly.

A similar speed-change technique may be employed to relieve the tips of gear teeth when required to prevent interference as teeth mesh. Referring to FIG. 21, it may be seen that the outermost portions 158 of the tooth profiles near the tip of the tooth, having greater curvature, are involute from a surface of revolution of lesser radius (or cone angle), i.e., that the transverse feeding speed of the cutter was reduced for the generation of the tip of the gear, and speeded up for the generation of the balance of the profile. Inasmuch as the cutter plane is maintained perpendicular to the plane of action irrespective of the feeding speed, it will be understood that the two involute portions of the tooth profile intersect at a common cylinder or cone at their point of merger so that the load is transferred smoothly as the contact line of the tooth with the tooth of its meshing gear moves from one involute portion of the tooth profile to the other. However, the transition from one plane of action to another effects a change of the length of the generating line which must be taken into account, particularly where the face width of the gear requires multiple generating passes.

FIG. 22 shows diagrammatically yet another form of profile modification which in other methods requires special cutters, e.g., a protuberance hob, but which in my method uses the standard cutters. This modification is useful when heat treatment and subsequent machining are contemplated, e.g., either further milling by the method of the invention, or by grinding. Post-heat treatment milling with available cutting materials is feasible at gear-blank hardnesses up to 62 Rockwell C. The tooth 160 shown in cross-section in FIG. 22 has an undercut 163 which is produced by a suitable relative positioning of the cutter and the gear when finishing the root with an axial slotting pass as earlier described. The undercut is typically sufficient to allow for the removal of a few thousandths inches of material after heat treatment, and so that the grinding wheel or skive finishing tool does not interfere with the fillet radius. The final tooth profile is generated from the same base surface so that the final involute profile indicated by the dotted lines 162 of FIG. 22 will have an involute profile parallel to that shown in solid line above the undercut.

A few of the feasible axial tooth modifications of which the method of the invention is capable are illustrated in FIGS. 23 to 25 inclusive.

In FIG. 23, a straight or helical cylindrical tooth is slightly crowned on both profiles for the sake of localizing the contact pressure with meshing teeth which may be straight or similarly crowned, and for insuring that shaft axis misalignment from perfect parallelism does not result in point contact at the axial edge of the teeth of either gear. Where a tooth of extended face width is generated by repeated feeding passes of a plane cutter with translation of the cutter endwise to extend the generating line, a gradual rotation of the cutter plane whilst maintaining its perpendicularity to the plane of action will produce the crowned profile.

FIG. 24 illustrates the curved teeth produced by the conical or cylindrical cutters of FIGS. 15 to 17 inclusive, where cutters of slightly different curvature are used respectively for the two meshing gears for the same ultimate purpose served by the crowning of straight teeth, namely, localization of the contact of meshing teeth theoretically to a point, but in actual fact to a more extended area of contact resulting from the resilient deformation of the tooth materials under load. Such curved teeth also are useful for applications where perfect shaft alignment cannot be achieved by design or in practice, as indeed are meshing curved teeth of circular outline of the same radius (not shown).

FIG. 25 illustrates diagrammatically meshing teeth which are tapered axially, the teeth of one of the meshing gears being shown in broken line for contrast. It will be understood that either or both of the tooth profiles has a slight modification of the base helix angle, the purpose of the reversely tapered teeth being the achievement of backlash control by relative axial movement of the two meshing gears.

Not shown is the meshing of crowned with uncrowned teeth, nor of circular teeth of the same curvature, nor of other combinations of meshable tooth forms within the capability of the versatile method of the invention.

FIVE-AXIS GENERATION OF BEVEL GEARS

The foregoing explanation of specific application of the method of the invention to the milling of bevel gears by the method of the invention has been limited to the 9-axis relationship of gear blank and individual cutters illustrated by way of example in the FIG. 2 modification of the machine of FIG. 1, i.e., a set-up in which two cutters may be employed simultaneously to cut opposing tooth flanks at the same time because the plane of action is vertical, i.e., parallel to the plane of the axes of the two cutters 64.

Figure 18A:
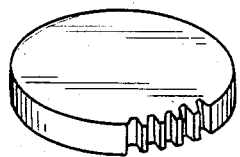
Figure 18B:
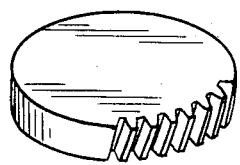
Figure 18C:
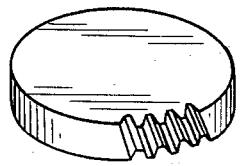
Figure 18D:
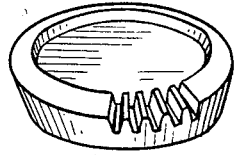
Figure 18E:
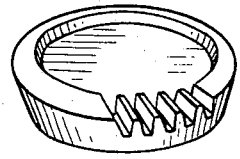
Figure 18F:
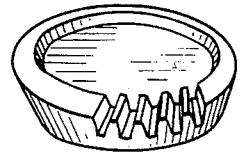
Figure 19F:
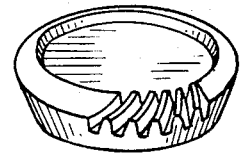

It is also possible, however, to mill any of the tooth forms of FIGS. 18(d) through (f) inclusive by single-cutter generation on a 5-axis machine, or on five axes of the 8-axis machine illustrated in FIG. 1, which is to say, using the two separate plane cutters 64 of the machine of FIG. 1 singly to generate all of the left-hand flanks and then (or alternately) to generate the right-hand flanks.

FIG. 26 illustrates the machine of FIG. 1 cutting a bevel spur teeth in gear blank 164 with only the cutter and machine head of column 50, the near column in FIG. 26, the cutter and machine head of the far column 52 being idle while its counterpart is active, and vice versa.. FIG. 27 shows a closer perspective view of the teeth of the gear blank of FIG. 26 at an intermediate point of the process of generation by only the first cutter, i.e., showing one profile 166 with involute form and root finishing completed, while the other wall 168 of the groove, subsequently to become the facing involute profile of the adjacent tooth, is straight and inclined from the base cone surface at an angle complementary to the cone angle of the back side of the cutter. For simplification, the scalloped effect of the pre-generation surface of the opposing flank 168 is omitted from FIG. 27.

The milling of the involute surface on a 5-axis or 8-axis machine where, as in FIG. 26, the plane of action tangent to the imaginary base cone of the gear blank is tilted away from the vertical plane of the spindle axes, using cutters whose axes are confined to but pivotable in that vertical plane, is better explained by reference to the diagrams of FIGS. 5 and 28.

From the simplistic if not ideal diagrammatic illustration of FIG. 5, it may be appreciated that the rolling movement of the base cone upon the circular plane of action may be effected as a relative rolling movement in several ways.

One of these, already discussed in connection with the machine modification of FIG. 2, i.e., with the base cone vertically tangent to a vertical plane of action, is to rotate the base cone about its own axis while simultaneously rotating the circular plane of action, with the cutters positioned therein, about the fixed axis of the circular plane of action at a speed such that there is no slippage between the base cone and the plane of action at their fixed and vertical line of tangency. Inasmuch as the plane of action is imaginary, this amounts to swinging the rotating cutters about the apex of the imaginary base cone as though they were rotating with the plane of action.

The same would equally be true of the machine of FIG. 1, i.e., with the base-cone axis vertical, *if* the cutter head mountings were modified for rotation of the cutter axes in planes parallel to the plane of action and for controlled linear mobility of the cutters *independently* on all three rectilinear axes, so as to maintain the cutters constantly perpendicular to the resulting inclined plane of action with substantially constant penetration thereof throughout the generating swing of the cutters, while the gear blank also rotates to maintain the relative rolling action.

Not yet suggested, but also possible, is the reverse of the simplistic arrangement of FIG. 5, namely, with the base cone 90 fixed non-rotatably in space and with the circular plane of action rolling on the base cone. In such a rolling movement, the axis 94 of the circular plane of action would nutate about the axis of the base cone at the apex of the cone, and the entire circular plane of action would nutate as the plane rolls upon the surface of the cone.

The generation of bevel teeth on the unmodified 8-axis machine of FIG. 1, as illustrated by FIG. 26, results, in fact, from the creation of the relative rolling movement between the base cone and the plane of action by a combination of aspects of all of the foregoing, viz., by an absolute rotation of the base cone on its own axis and by an absolute nutative rolling motion of the circular plane of action on the base cone.

These absolute motions are the sum or resultant of the relative movement between the base cone and the plane of action as a mutual rotation about their respective axes in non-slipping rolling contact at a given line of tangency, together with a simultaneous rotation of that system, as a whole, about the axis of the base cone while the axis of the plane cutter is rotated in its confining vertical plane to maintain the cutter face constantly perpendicular to the plane of action, and the cutter axis is simultaneously translated with respect to all three orthogonal axes to maintain the penetration of the plane of action by the cutter, and its placement therein, as the plane nutates.

a. Mathematical Development

Because the generating movement of the cutter relative to the gear blank is a movement of the cutter toward or away from the line of tangency of the base surface with the plane of action, it is convenient first to derive the mathematical relationships for the general (conical) case within the framework of the right-handed orthogonal system illustrated in FIG. 28, wherein the system origin is centered at the apex of the base cone of the gear blank with the vertical or Z-axis coinciding with the axis of the base cone, with the XZ plane passing through the axis of the base cone and its line of tangency to the plane of action, the tangent being assumedly fixed in the XZ plane by the relative rotational velocities of the base cone and plane of action about their respective axes.

Within this system, the required roll angle of the base cone (gear blank) about its axis, the roll angle of the plane of action (cutter) about its axis, and the coordinates of the center of the cutter, are determined for single-cutter generation without regard to the machine constraint of the cutter axis to a vertical plane, i.e., as though the cutter axis were freely rotatable in a plane parallel to the plane of action as the latter rotates.

The two roll angles and the coordinates are determined as functions of the transverse pressure angle of the base cone and (assuming multiple-pass generation) of the cone distance to the center of the generating line as two independently variable parameters, and with respect to certain constant parameters fixed by the characteristics of the gear to be cut, namely, the base cone angle, the radius of the base helix base circle (120 in FIG. 5), the initial distance between the plane of action and the axis of the cutter spindle, and the angle between the plane of action and the plane in which the cutter axis is confined.

Then, because the cutter axis is confined in a vertical plane transverse to the axis of movement of the machine carriage, those mathematical relationships are adapted to the real system, i.e., with respect to a coordinate system in which the plane of rotation of the cutter axis is parallel to the YZ plane of the machine. This amounts to rotating the original coordinate system about its Z-axis through a variable angle $\sigma$ until the new Y-axis, Y', is parallel, and the new X-axis, X', is perpendicular, to the vertical plane of the cutter axis. That angle, $\sigma$, like the other variables, is derived as a function of the independent variables, namely, the transverse pressure angle and the cone distance to the center of the cutter plane, or more exactly, the radial distance from the center of the plane of action to the center of the generating line.

FIG. 28.1 shows the base cone, plane of action, cutter, and cutter axis projected to the XZ plane; FIG. 28.2 shows the same projected to the XY plane; FIG. 28.3 the same projected to the YZ plane; FIG. 28.4 the same projected to the plane of action; FIG. 28.5 the same projected to the cutter plane; FIG. 28.6 the same projected to the Y'Z plane; and FIG. 28.7 is a projection of the same to the transverse plane, i.e., a plane perpendicular to the line of tangency. The latter projection is "rolled out", i.e., the back cone of the base cone is developed in the plane of the drawing as a transverse base circle, i.e., a full circle of radius equal to the back cone distance, and the arcuate traversing path of the cutter relative to the line of tangency during the relative rolling movement of the base cone and plane of action is developed as the equivalent linear distance d in the plane of the drawing from the point projection of the line of tangency in FIG. 28.7 to the projection P of the center C of the cutter plane.

The transverse pressure angle selected as the basic independently variable parameter is the angle $\phi_T$ in FIG. 28.7. It is the angle in the transverse plane between the transverse radius of the base cone to the line of tangency, and a transverse radius to the intersection of the involute tooth profile 114 with the plane of action 92 (FIG. 5).

The minimum value of the transverse pressure angle $\phi_T$ is determined by the designated start-of-active profile and would have a value of zero if the involute profile were to be generated right down to the surface of the base cone. The maximum value of $\phi_T$ is determined by the addendum surface of the gear blank and is that value which is necessary to assure that, on the generating pass of the cutter away from the line of tangency, the trailing end of the generating line has cleared the addendum surface.

The simultaneous angular positions of the base cone about its own axis and of the plane of action (i.e., the cutter) about the axis of the plane of action, are derived from the transverse pressure angle.

From FIG. 28.7, it will be seen that the transverse roll angle, $\nu_T$, of the base cone to generate the involute 114 to the extent there shown, if measured in radians from the given line of tangency, equals the tangent of the transverse pressure angle:

$$\theta_T = \tan \phi_T \quad (1)$$

That is to say, as the transverse arc subtended by the angle $\theta_T$ is equal in length to the developed distance d of the center P of the generating line from the line of tangency, dividing both by the base cone transverse radius $R_{BT}$ demonstrates that $\theta_T$ in radians equals $\tan \phi_T$.

From FIGS. 28.1 and 28.7, it may be appreciated that the developed distance d of the center of the generating line from the line of tangency, considered respectively as the arc of the transverse base circle of the base cone, as the arc of the actual base circle of the base cone, and as the arc of the circular plane of action, subtends different but related angles in the transverse plane, in the plane of rotation of the base cone about its own axis, and in the plane of action, and that those angles are inversely proportional to the base cone transverse radius (back cone distance) $R_{BT}$, the base circle radius R, and the base cone distance A. Therefore, as the cone angle of the base cone is $\Gamma$, the transverse roll angle of the base cone is $$\theta_T = \frac{d}{R_{BT}} = \frac{d}{R/\cos\Gamma} \quad (2)$$

the roll angle $\rho$ of the base cone (gear blank) about its own axis is $$\rho = \frac{d}{R} \quad (3)$$

and the roll angle of the plane of action (cutter) about the roll axis of the plane is $$\beta = \frac{d}{A} = \frac{d}{R/\sin\Gamma} \quad (4)$$

Dividing equation (3) by (2), and (4) by (3)

$$\rho = \theta_T/\cos \Gamma \quad (5)$$

$$\beta = \rho \sin \Gamma \quad (6)$$

and the ratio of the angular velocity of the plane of action (cutter) about its axis to the angular velocity of the base cone (gear blank) about its axis for relative rolling movement without slipping is $$\beta/\rho = \sin \Gamma \quad (7)$$

While the values ascribed to R and A in the foregoing explanation were those at the base circle of the base cone, the derived relationships are valid at any selected lesser value of the cone distance A, which has the constant relation to a corresponding radius R of the cone expressed in equations (4), namely $$R = A \sin \Gamma \quad (8)$$

As will best be appreciated from FIG. 28.4, the cutter 64 is positioned perpendicular to the plane of action 92 and with its axis parallel thereto (FIG. 28.1). It is shown there and in all views of FIG. 28 with the center P of its generating line 118 at the edge of the plane of action 92 and with the generating line, extended in the plane of action, tangent to a base helix base circle 120 of radius $R_H$, resulting in a helix angle $\psi$ with a plane-of-action radius to the center P of the generating line 118 in the illustrated case at the perimeter of the plane of action. From FIG. 28.4, $$\psi = \sin^{-1}(R_H/A) \quad (9)$$

Thus, the angle of the projection of the cutter axis to the plane of action (FIG. 28.4), measured with respect to the Y-axis, becomes $\beta+\psi$.

The cutter axis projected at the XZ plane makes the angle G with the Z-axis (FIG. 28.1), an angle equal in value to the cone angle $\Gamma$. Projected to the YZ plane (FIG. 28.3 and FIG. 28.8), the cutter axis makes the angle $\alpha$ relative to the Y-axis. Then, from FIG. 29

$$\tan\alpha = \frac{a \cos G}{b} \tag{10}$$

$$\tan(\beta + \psi) = \frac{a}{b} \tag{11}$$

wherefore, $\alpha=\tan^{-1}(\tan(\beta+\psi)\cos G)$ (12)

Projected to the XY plane (FIG. 28.2), the cutter axis makes the angle $\sigma$ relative to the Y-axis. Again, from FIG. 28.8, $$\tan\sigma = \frac{a \sin G}{b} \tag{13}$$

wherefore, $\sigma = \tan^{-1}(\tan(\beta + \psi)\sin G)$ (14)

The coordinates of point C, the center of the cutter, in the XYZ system (FIGS. 28.1 and 28.4), are:

$$x_C = A \cos \beta \sin \Gamma + H \cos G \tag{15}$$

$$y_C = A \sin \beta \tag{16}$$

$$z_C = -A \cos \beta \cos \Gamma + H \sin G \tag{17}$$

where A is the base cone distance, R is the radius of the base cone at such distance and H is the distance of the cutter axis from the plane of action.

From the foregoing equations, it will be seen that all concurrent instantaneous values of the angle of rotation $\rho$ of the gear blank about its axis, the angle of rotation $\beta$ of the cutter about the axis of the plane of rotation, the helix angle $\psi$, the angles made by the projections of the cutter axis in all three orthogonal planes, and the coordinates of the center C of the cutter, are all ultimately expressed in terms of the two independently variable parameters $\phi_T$ and A, and the constants $\Gamma$, G, $R_H$, and H.

The value of A, namely, the radial location in the plane of action of the center P of the chordal increment 118 of the generating line, may be varied in several ways to generate a tooth profile of face width exceeding the radial projection of that chordal increment in the plane of action. FIG. 28.4 shows a shaded segment of the circular plane of action which represents as an area of the plane the overall generating sweep for a gear of face width exceeding the length of the chordal generator of the cutter.

It is obvious that if the radial projection of the chordal generating line 118 of the cutter in the plane of action exceeds the face width of the gear, A may be held constant because the tooth profile will be generated in a single traverse.

Where that projection is less than the face width of the gear, the value of A may be varied in steps between generating traverses so as to sweep the generating path in contiguous or overlapping circular bands, or the value of A may be varied slowly and continuously to traverse radially of the plane of action while the cutter is swung by the rotation of the plane of action about its own radius. If the zig-zag pattern analogous to FIG. 9 is to be followed by including a continuous radial feed, the total radial traverse of one generating pass may not exceed one-half the length of the radial projection of the chordal increment 118, with the result that most, if not all, of the face width of the tooth profile is traversed twice by the generating line. In that circumstance, A may be varied as a function of $\phi_T$ such that no ungenerated areas are left on the tooth profile.

b. Mathematical Relationships Modified For 5-Axis Generation

As shown in FIG. 28.2, a secondary coordinate system consistent with the five of the eight axes of the actual machine of FIG. 26 may be established by rotating the X-axis and Y-axis about the Z-axis until the Y-axis is parallel to the projection of the rotational axis of the cutter to the XY plane, which is to say, parallel to the transverse plane of the machine in which the spindle axes are confined.

So rotated, the X'-axis and Y'-axis make the variable angle $\sigma$ with their original positions, and the roll angle of the plane of action and of the base cone (gear blank), measured originally from the line of tangency in the XZ plane, must be referred to the new X'-axis.

Thus, the roll angle $\rho$ of the gear blank about its axis becomes $\rho-\sigma$ with respect to the X'-axis, and $$\rho-\sigma=\tan \phi_T/\cos \Gamma-\tan^{-1}(\tan(\tan \phi_T \tan \Gamma+\sin^{-1}(R_H/A))\sin G) \tag{18}$$

In the vertical plane of the machine which contains the spindle axis and is parallel to the Y'Z plane (FIG. 28.6), the angle of the cutter axis relative to the Y'-axis, $\alpha'$, may be determined from FIG. 28.8, as follows:

$$\sin\alpha' = \frac{a \cos G}{a/\sin(\beta + \psi)} \tag{19}$$

$$\sin\alpha' = \sin(\beta + \psi)\cos G \tag{20}$$

and substituting the values of $\beta$ and $\psi$ using equations (1), (5), (6), and (9), $$\alpha'=\sin^{-1}(\sin(\tan \phi_T \tan \Gamma+\sin^{-1}(R_H/A))\cos G) \tag{21}$$

The coordinates of the center of the cutter, adjusted to the X'Y'Z system are similarly recalculated. From FIG. 28.2 it will be seen that $$x_C' = x_C \cos \sigma + y_C \sin \sigma \tag{22}$$

From FIG. 28.2, it will also be seen that $$y_C' = y_C \cos \sigma - x_C \sin \sigma \tag{23}$$

Lastly $z_C' = z_C$ (24)

It will be seen that all concurrent coordinate values and values of the angles of rotation $\rho-\sigma$ of the gear blank and of the spindle axis $\phi'$ are expressed ultimately in terms of the transverse pressure angle $\phi_T$ and the radial distance A to the center of the incremental generating line in the plane of action as independent variables.

The result is that the 8-axis machine of FIG. 26 cuts the bevel tooth profile by a generative movement which amounts to the relative rolling motion of the base cone and circular plane of action at a given line of tangency which itself is rotated about the base cone axis to enable the plane cutter to maintain its perpendicularity to, and its position in, the nutating plane of action by rotation of its axis in its fixed vertical plane and by concurrent relative linear movements of the cutter and gear blank.

It will be appreciated from FIG. 28.7 and from earlier discussion that simultaneous generation of opposing tooth profiles implies different simultaneous values and signs of the transverse pressure angles $\phi_T$ of opposing profiles at the same time, resulting in different simultaneous values of the X' coordinates of the two cutters. As this is not possible in the machine of FIG. 1 or FIG. 26, that machine is limited to single cutter generation of conical gears one tooth profile at a time.

c. Mathematical Conditions For Two-Cutter Conical Generation

In the modified machine of FIG. 2, having the additional rotational axis represented by the tiltable table, the angle G (FIG. 28.1) is reduced to zero by the tilting of the table 32 by an amount equal to the cone angle $\Gamma$ to position the plane of action 92 vertical and parallel to the common plane of the cutter axes.

Inasmuch as the angle G was equal to $\Gamma$, $$G = \Gamma - \Gamma = 0 \tag{25}$$

with the result that $$\sin G = 0$$

$$\tan G = 0$$

$$\text{and } \cos G = 1$$

Substituting these values in Equations (12), (14), and (20), $$\sigma = 0 \tag{26}$$

$$\alpha = \beta + \psi \tag{27}$$

$$\alpha' = \alpha \tag{28}$$

$$\text{and } \rho - \sigma = \rho - 0 = \rho \tag{29}$$

With $\sigma$ equal to zero, i.e., no longer a function of the transverse pressure angle $\phi_T$, the same gear blank rotation $\rho$ satisfies both cutters whose axes must lie in the same plane, namely the condition provided by the machine of FIG. 2.

d. Mathematical Demonstration That Cylindrical Generation Is a Limit of the General Method The following analysis shows that the generation of cylindrical gears is simply a particular limiting case of the generation of helical bevel gears.

For the cylindrical case, the spindle axis angle $\alpha'$ in the Y'Z plane must be set at the base helix angle, i.e., $$\alpha' = \psi \tag{30}$$

the spindle axis angle $\sigma$ in the X'Y' plane must be zero, i.e., $$\sigma = 0 \tag{31}$$

the gear blank rotation angle must equal the transverse roll angle, i.e., $$\rho - \sigma = \theta_T \tag{32}$$

the x' coordinate of the cutter center must equal the base circle radius dimension plus the distance of the cutter axis from the plane of action, i.e., $$x_{C'} = R + H \tag{33}$$

and the y' coordinate of the cutter center must be $$y_{C'} = R \tan \phi_T \tag{34}$$

To demonstrate, as the cone angle of a cylinder is zero, $$\sin G = \sin \Gamma = 0 \tag{35}$$

$$\tan G = \tan \Gamma = 0 \tag{36}$$

$$\text{and } \cos G = \cos \Gamma = 1 \tag{37}$$

Accordingly, the value of the angle of rotation $\rho$ of the base surface (gear blank) taken from Equation (5) and (1), namely
$\rho = \tan \phi_T / \cos \Gamma$
is reduced to $$\rho = \tan \phi_T \tag{38}$$

The roll angle $\beta$ of the plane of action (the swing of the cutter), taken from Equations (6), (5) and (1) as $$\beta = \tan \phi \tan \Gamma$$

is reduced to $$\beta = 0. \tag{39}$$

The angle $\alpha'$ of the cutter axis projected to the Y'Z plane, using Equations (20), (37), and (39), is $$\alpha' = \sin^{-1}(\sin(\beta + \psi)\cos G)$$
$$= \sin^{-1}(\sin(0 + \psi) \times 1)$$
$$= \sin^{-1}(\sin\psi)$$
$$\alpha' = \psi \quad \text{Q.E.D.}$$

The foregoing will be recognized as Equation (30).

The angle $\sigma$ of the cutter axis projected to the XY plane, from Equations (14), (39), and (35), is $$\sigma = \tan^{-1}(\tan(\beta + \psi)\sin G) \tag{40}$$
$$= \tan^{-1}(\tan(0 + \psi) \times 0)$$
$$\sigma = 0 \quad \text{Q.E.D.}$$

which will be recognized as Equation (31).

The angle of rotation of the gear blank, $\rho - \sigma$, from Equations (38) and (40), and (1), is $$\rho - \sigma = \tan \phi_T - 0$$

$$\rho - \sigma = \theta_T \quad \text{Q.E.D.}$$

which will be recognized as Equation (32).

The x' coordinate of the center C of the cutter, from Equations (22) and (40), is $$x_{C'} = x_C \cos\sigma + y_C \sin\sigma \tag{41}$$
$$= x_C \times 1 + y_C \times 0$$
$$= x_C$$
(from Eq. 15) $\quad = A \cos\beta\sin\Gamma + H\cos G$
(from Eq. 8) $\quad = R \cos\beta + H\cos G$
(from Eqs. 37 & 39) $\quad = R \times 1 + H \times 1$ -continued
$$x_{C'} = R + H \quad \text{Q.E.D.}$$

which is Equation (33).
From Equations (2) and (4)

$$R_{BT}\theta_T = A\beta \quad (42)$$

and from Equation (6), it is apparent that as $\Gamma$ approaches zero, so also does $\beta$ and therefore the sine of $\beta$. Thus, in the limit, $$\sin \beta = \beta. \quad (43)$$

The $y'$ coordinate of the cutter center C, from Equation (23) is $$
\begin{aligned}
y_{C'} &= -x_C \sin\sigma + y_C \cos\sigma \\
\text{(from Eq. 31)} \quad &= -x_C \times 0 + y_C \times 1 \\
&= y_C \\
\text{(from Eq. 16)} \quad &= A \sin\beta \\
\text{(from Eq. 43)} \quad &= A\beta \\
\text{(from Eq. 42)} \quad &= R_{BT}\theta_T \\
\text{(from Eq. 2)} \quad &= (R/\cos\Gamma)\theta_T \\
\text{(from Eq. 37)} \quad &= (R/1)\theta_T \\
&= R\theta_T \\
\text{(from Eq. 1)} \quad y_{C'} &= R \tan\phi_T \quad \text{Q.E.D.}
\end{aligned}
$$

which is Equation (34).

HYPERBOLOIDAL GEARS

The generation of involute tooth profiles of gear teeth has been considered earlier herein on the usual basis of meshing gears whose axes lie in the same plane, intersecting in the conical case, and parallel in the cylindrical case. The method of the invention is, however, applicable equally to the manufacture of gear pairs designed for the direct connection of shafts having non-parallel, non-intersecting axes, i.e., gears whose pitch surfaces are essentially the frustra of single-sheet hyperboloids of revolution tangent along a shared generatrix.

Two such pitch-surfaces hyperboloids 171 and 172 are shown in orthographic projection in FIGS. 29.1, 29.2, and 29.3.

The elevational view of FIG. 29.2 is the projection of the hyperboloids to a plane perpendicular to the mutual perpendicular 174 to the two hyperboloid axes 176 and 178, which is accordingly projected in FIG. 29.2 as the point P defined by the intersection of the two axes. In FIG. 29.2, the line of tangency 180, i.e., the common generatrix, is accordingly projected at full length, and the angle $\Sigma$ between the hyperboloid axes, and the angles $G_1$ and $G_2$ between each of them respectively and the projected line of tangency 180 of the two hyperboloidal surfaces, are projected at their maximum values.

In the end view of FIG. 29.3, the axes 176 and 178 of the two hyperboloids are projected as parallel lines which may also be taken as the projections of the parallel planes containing the two skewed axes 176 and 178, those planes being spaced apart at a distance C by the mutual perpendicular 174 to the two axes. Because the line of tangency 180 is depicted horizontally in FIG. 29.2, it projects as a mere point on the mutual perpendicular 174 in FIG. 29.3, dividing the mutual perpendicular into two segments $X_1$ and $X_2$, which are proportional to the projected angles $G_1$ and $G_2$.

From FIGS. 29.1 and 29.2 it may be appreciated that the meshing engagement of hyperboloidal gears, whose pitch-surface tangent 180 is askew from both axes of rotation, is accordingly a rolling action combined with a relative lateral sliding motion along the tangent line 180 of the pitch surfaces, as distinguished from the simple rolling motion of the pitch surfaces of gears having coplanar axes.

Inasmuch as a single-sheet hyperboloid may be regarded as the envelope of two symmetrical series of coaxial cones of decreasing and increasing cone angle whose common axis is the locus of their apices, and which merge in a cylinder at the least radius of the hyperboloid, an essentially hyperboloidal gear connection between non-parallel, non-intersecting shafts may be made in two ways. If the connection be made at locations along the tangent pitch surfaces axially remote from the mutual perpendicular 174 to the axes 176 and 178 of the shafts, i.e., where axially limited frustra of the hyperboloidal pitch surfaces are essentially conical, the connection can be made by conical gears commonly referred to as "hypoid" gears. If the connection between the shafts is made at the least distance between the axes, i.e., so as to include their common perpendicular 174 in the two meshing gears, the connection can be made with two cylindrical gears whose pitch surfaces are the essentially cylindrical "waist" portions of the two hyperboloids. Such gears are commonly referred to as cross-helical or "skew" gears.

As a point of departure from which to explain the generation of conjugate tooth profiles of hyperboloidal bevel gears, it will be well to recall that in the ordinary bevel gear case, i.e., where the shaft axes intersect, the base cones of the two gears are tangent to opposite sides of the same circular plane of action with their apices coincident at its center, and with the meshing tooth profiles of the two gears generated as though by the same generating line in that plane of action. Moreover, in the usual case of symmetrical teeth, the plane of action of the opposite tooth profiles of both gears, intersecting the first plane of action on the pitch line of the gears, is also tangent to the same two base cones.

In applying the method of the invention to the generation of hyperboloidal gears of the general conical or "hypoid" case, the meshing tooth profiles are similarly generated from two base cones which are respectively tangent to the opposite sides of a common plane of action, but the apices of the cones do not coincide. Accordingly, each base cone has a separate circular path in the common plane of action. Conjugate action of such gears, i.e., a constant ratio of angular velocities, is nevertheless obtained by using the same generating line for the meshing profiles of the two gears, or, more specifically, in acknowledgment of the separate generation of the meshing profiles, by assuring that the generating lines of the meshing profiles of the two gears coincide throughout the zone of action of the two profiles in the overlap of the separate circular paths of their base cones in the common plane of action.

As it will further be apparent that it is not possible for two base cones with non-coincident apices to be tangent simultaneously to the opposite sides of two different planes of action, the opposite meshing profiles of the two hypoid gears are generated from a second pair of base cones each respectively coaxial with the first base cone of its gear,, but having a different apex, a different cone angle, and typically, but not necessarily, a different base circle.

These criteria for the generation of hyperboloidal bevel gears are developed graphically in FIGS. 29.2, 29.3, and 29.4 for the general case where the two gears include the transverse hyperboloidal sections through the point Q on the common tangent 180. Pitch cones 181 and 182 are tangent respectively to the hyperboloidal surfaces 171 and 172 at the indicated transverse sections 184 and 186 which are accordingly bounded by pitch circles 185 and 187. The pitch cones 181 and 182 are thus in contact at the point Q on the line of tangency 180 of the hyperboloidal pitch surfaces. In FIG. 29.3, the pitch circles 185 and 187 of the pitch cones project as ellipses, and the pitch plane 188, i.e., the plane mutually tangent to the pitch cones along the contact line, projects as a straight line.

To develop the geometry for one set of meshing profiles, a plane 190 is passed through the pitch line 180 at the desired transverse pressure angle $\theta_{TL}$ to the pitch plane 188 to constitute the plane of action for the left tooth profiles. Lesser concentric circles 191 and 192 in the bases of the pitch cones 181 and 182 tangent to the plane of action 190 are the base circles of the two corresponding base cones 201 and 202, whereas the intersections of the plane of action 190 with the respective axes 176 and 178 determine the apices 198 and 200 of the two base cones 201 and 202 tangent to that plane of action. In the illustrated case, a transverse pressure angle of 20° determines the configuration of the base cone 201 for the larger gear and the base cone 202 for the smaller.

The selection of a desired transverse pressure angle $\theta_{TR}$ for the engagement of the opposite or right profiles of the teeth of the two gears determines the location of the opposite plane of action 204, which, by the same procedure, results in the definition of a second pair of base cones 206 and 208 for the opposite tooth profiles. Thus, the second base cone for each gear has a different apex and a different cone angle, and, if the transverse pressure angle $\theta_{TR}$ is different from that for the left profiles, will also have a different base circle.

In FIG. 29.4, the circular paths 211 and 212 of the base circles 191 and 192 of the base cones 201 and 202 for the left-hand tooth profiles of both gears are developed by projection from FIGS. 29.3 and 29.2.

The points of tangency $S_1$ and $S_2$ of the base cone base circles with the left-hand plane of action 190 are projected to the transverse sections 184 and 186 in FIG. 29.2, and the projections of the lines of tangency 194 and 196 of each of those base cones to the left-hand plane of action 190 are drawn in FIG. 29.2 to determine the point R of their common intersection with pitch line 180 extended.

Then in FIG. 29.4, the pitch line 180 is projected perpendicularly from the plane of action 190 in FIG. 29.3, a convenient point is selected for the point R, the intersections of the plane of action 190 with the projections of the axes 176 and 178 in FIG. 29.3 are similarly projected, and the distances of the base cone apices 198 and 200 from the point R, projected to the pitch line 180, are transferred from FIG. 29.2 to FIG. 29.4 to determine the locations of the points 198 and 200 by projection from the line 180 to intersect with the projections of the points 198 and 200 from FIG. 29.3. The apices 198 and 200 of the base cones 201 and 202, as thus located in FIG. 29.4, are the centers of the circular planes of action for each of the base cones, or, more precisely, the respective circular paths of relative rolling movement of the base cones 201 and 202 upon the opposite sides of their common plane of action 190.

Lines drawn in FIG. 29.4 from the projected apices 198 and 200 of the base cones to the point R are therefore the lines of tangency 194 and 196 of each base cone with the left-hand plane of action 190, and thus also the projections of the two axes 176 and 178 to that plane of action.

From the points 198 and 200 in FIG. 29.4, arcs struck at the respective cone distances of the base cones 201 and 202 are the circular paths of the base circles 191 and 192 of those cones in the common plane of action. A face width W1, selected within limits and with the circular path 211 approximately centered therein, may be taken to determine, by its intersections with the pitch line 180, a suitable face width W2 for the meshing gear. The overlap of those annular bands in the space between the lines of tangency 194 and 196 of the two base cones in FIG. 29.4, determines the outer limits of the zone of action 300 of the meshing left-hand tooth profiles in their plane of action 190, the actual size and shape thereof within those limits being governed usually by the intersection of the addendum surface with the plane of action.

It is within this limited zone of action that the tooth profiles are engaged, and within this zone of action that the generating lines for the meshing profiles of both gears must therefore coincide for conjugate action.

If, for example, the gear designer should decide that the teeth generated from the base cone 201 should be axial, the generating line in the plane of action would remain aligned radially with respect to the center 198 in its movement through the zone of action, whereas it would be concomitantly necessary to pivot the cutter, i.e., the generating line, for generation from the base cone 202 as the generating line swung about the center 200 while traversing the zone of action in order to provide tooth contact along the identical line in the zone of action.

If, for example, it were desired that the line of contact of the meshing tooth profiles be parallel to the pitch line 180, it would be necessary to pivot the generating lines of both gears as they swing about the centers 198 and 200 in order to maintain the coincidence of the two generating lines during their separate traverses of the zone of action.

As indicated earlier, the pivoting of the straight generating line provided by the plane cutter of FIGS. 1 to 6 is provided by the pivoting of the cutter head 62 on an axis which lies in the plane of the cutter 64 and intersects the rotational axis of the cutter.

Locating the base cones 206 and 208 in the same manner by the selection of an appropriate transverse pressure angle $\theta_{TR}$ to determine the right-hand plane of action 204, the necessary geometry is established for generating the right-hand tooth profiles. In this way, the opposing flanks of a single hyperboloidal bevel gear are generated from base cones which are coaxial but which have different apices and different cone angles.

In the cylindrical case, i.e., where the gear connection between two such non-parallel, non-intersecting shafts is made at the least distance between them, there is no common or shared plane of action as in the skewed conical case because the cylinders interiorly tangent to the hyperboloids at their least radius have no apices. Rather, each cylindrical gear has its own plane of action, which is tangent to its base cylinder, passes through the point of contact (pitch point) of the two pitch cylinders, and intersects the plane of action of the other in a straight line which passes through the pitch point and is the locus of the point contact of the active profiles of the engaged teeth of the two gears.

Such gears can be generated like any other helical cylindrical gear in the manner explained earlier herein.

CONCLUSION

The method of the invention, whether practiced in limited scope to generate cylindrical gears on a 4-axis machine, or more fully to generate cylindrical and bevel gears on five-, six-, eight-, or nine-axis machines, produces gears at a much greater rate than is possible by the existing procedures referred to at the beginning of this specification, due to the complete independence of the cutting speed of the cutter from its generating movement and the ability to remove metal at a very substantial rate without detrimental effect upon the finish of the tooth profiles produced. The time advantage over the prevailing hobbing procedure is very substantial and the finish of the tooth profiles produced is far superior to the scalloped finish left by the hob.

The superiority of the method here disclosed over all known machining procedures, over and above its speed, is its versatility in the production of gears of many kinds, sizes, and design specifications with cutters of relatively few sizes, which, as illustrated herein in the case of plane cutters, can perform the rough and finish machining in a single operation.

The features of the invention believed new and patentable are set forth in the following claims.

What is claimed is:

1. In the manufacture of a gear, the method of machining a gear blank to produce a tooth profile which is involute from an imaginary base surface of revolution within said gear blank, said surface having a straight-line generatrix and having an imaginary plane of action tangent to said surface, said method comprising the steps of rotating a cutter having a plurality of cutting edges uniformly spaced about the entire periphery of the cutter sweeping a cutting path in the form of a surface of revolution about the axis of the cutter so that said plurality of cutting edges are distributed substantially uniformly about the common surface of revolution which they define, said cutting-path surface comprising a plunge-cutting rim portion of cutting thickness not exceeding the desired tooth space at the tooth root and a contiguous tooth-profile cutting portion, positioning the rotating cutter on the side of said plane of action opposite to said base surface with said rim portion penetrating said plane of action and with said tooth-profile cutting portion intersecting said plane of action along a predetermined generating line and with said tooth-profile cutting portion perpendicular to said plane of action at least at the center of said generating line, independently controlling the rotation of the cutter, and effecting a relative feeding movement of said gear blank and rotating cutter independently of the rotation of the cutter while maintaining the aforesaid position of the cutter relative to said plane of action, said feeding movement being such as:

to cause a relative rolling motion between said base surface and said plane of action without slippage;

to cause said generating line at all points therealong to maintain a controlled angularity with respect to the instantaneous direction of its movement relative to the line of tangency of said base surface with said plane of action during said rolling motion; and to cause said rotating cutter to penetrate said gear blank and said generating line to traverse said gear blank between its addendum surface and a depth at which the desired active tooth-profile is achieved at the center of said generating line.

2. The method of claim 1 wherein the tooth-profile cutting portion of the cutting path of the cutter is a circular plane, the rim portion thereof extends axially of the cutter at the periphery thereof, and the generating line is a straight line.

3. The method of claim 1 wherein the tooth-profile cutting portion of the cutting path of the cutter is a cone, and the generating line is a conic section arc to the center of which an element of the cone is perpendicular, the plunge-cutting rim portion being turned outwardly for an axially convex tooth flank and turned inwardly for cutting an axially concave tooth flank.

4. The method of claim 1 wherein the tooth-profile cutting portion of the cutting path of the cutter is a cylinder with its axis perpendicular to the plane of action and the generating line is a circular arc, the rim portion of the cutting path being turned outwardly of the cylinder for cutting an axially convex tooth flank and inwardly for cutting an axially concave tooth flank.

5. The method of claim 1 wherein said controlled angularity of the generating line remains constant throughout its said traverse.

6. The method of claim 5 wherein the relative feeding movement of the gear blank and rotating cutter is accomplished by rotating the gear blank about the axis of its base surface and by simultaneously moving the cutter so as to cause every point on said generating line to maintain an instantaneous component of velocity in said instantaneous direction equal to the instantaneous peripheral velocity of the base surface at the projection of each such point to said line of tangency along the path of said relative rolling motion.

7. The method of claim 6 applied to the simultaneous machining of the opposite flanks of two spaced teeth of the same gear blank, comprising the complementary use of two such cutters disposed with the tooth-profile cutting portions of their respective cutting paths in facing relation and with their rotational axes making the same angles with a normal to the plane of action, and being separated by a transverse base tangent measurement, said relative feeding movements of the cutters occurring in unison and causing the generating line of one cutter to traverse the gear blank from the addendum surface to said depth while the other cutter traverses oppositely.

8. The method of claim 7 applied to the machining of cylindrical gears and further comprising the use of a pair of such cutters having planar tooth-profile cutting portions in facing parallel relation at a transverse base tangent between their planes and with their generating lines substantially of equal length and substantially coincident projection to the line of tangency of the base cylinder to the plane of action.

9. The method of claim 7 applied to the machining of bevel gears which further comprises employing a pair of such cutters having planar tooth-profile cutting portions facing toward one another with their generating lines at the centers of said lines intersecting equal radii of the circular plane of action at equal angles and with said radii spaced apart by a transverse base tangent angle.

10. The method of claim 5 employed to machine gears having a face width greater than the length of said generating line, wherein the tooth-profile cutting portion of the cutting path of the cutter is a circular plane, the rim portion thereof extends generally axially of the cutter at the periphery thereof and the generating line is a straight line, the additional steps of translating the cutter along an extension of said generating line to displace said generating line endwise a distance not greater than the length of said line for successive traverses of said gear blank by said generating line, and repeating said relative feeding movement and displacing the generating line endwise as aforesaid as frequently as may be necessary to extend the generated tooth-profile to the desired width.

11. The method of claim 10 wherein the endwise displacement of said generating line and the relative feeding movement of the cutter and gear blank occur simultaneously, and wherein said successive traverses of the gear blank by the generating line occur in opposite directions.

12. The method of claim 6 employed to machine cylindrical gears wherein the gear blank is mounted for rotation about the axis of the base cylinder and the cutter axis is rotatable in a plane parallel to the axis of the base cylinder, the cutter axis also has two degrees of rectilinear motion in said cutter-axis plane, said cutter-axis plane is movable relative to the gear blank axis toward and away from the same, and said relative rolling action of the base cylinder and the plane of action is accomplished by rotating the gear blank on its own axis while simultaneously moving the cutter axis linearly in the cutter-axis plane so as to move said generating line with a component of motion perpendicular to the line of tangency of the base cylinder to said plane of action in the direction and with the velocity of the peripheral movement of said base cylinder at said line of tangency.

13. The method of claim 12 adapted for the simultaneous machining of two opposite tooth profiles of the same gear blank by the simultaneous employment of a second cutter positioned and movable and moved in the manner specified for the single cutter of claim 12, with the axes of both cutters in the same cutter-axis plane, with the tooth-profile cutting portions of said two cutters parallel and facing each other at a transverse base tangent distance and with their generating lines of substantially equal length and projection to said line of tangency.

14. The method of claim 1 employed to machine the tooth-profiles of bevel gears on a 5-axis machine wherein the gear blank is mounted for rotation about its own axis, the cutter axis is movable linearly along three mutually perpendicular axes which define planes respectively parallel and perpendicular to the gear blank axis, and pivotable about an axis perpendicular to one of said planes parallel to the axis of the gear blank, and said relative rolling motion of the base cone and the circular plane of action is accomplished in part by rotation of the gear blank on its own axis and in part by the nutation of the plane of action about the axis of the gear blank, said nutation of the plane of action being effected by pivoting the axis of the cutter while translating the same along said mutually perpendicular axes in order to maintain the perpendicularity of said tooth-profile cutting portion to, and its penetration of, the plane of action, and to maintain said angularity of the generating line.

15. The method of claim 14 in which the tooth-profile cutting portion of the cutting path of the cutter is a circular plane, the rim portion thereof extends generally axially of the cutter at the periphery of said circular plane, the generating line is a straight line, said controlled angularity is constant, and the axis of the cutter lies in a plane parallel to the axis of the gear blank, the pivot axis of the cutter axis lies in said circular plane, and wherein the simultaneous values of (a) the angular displacement of the gear blank,
(b) the angular displacement of the cutter axis, and
(c) the three rectilinear coordinates of the center of the circular cutting plane are specified respectively, with respect to said five axes, as follows:

(a) $\tan \phi_T / \cos \Gamma - \tan^{-1}(\tan(\tan \phi_T \tan \Gamma + \sin^{-1}(R_H/A))\sin G)$
(b) $\sin^{-1}(\sin(\tan \phi_T \tan \Gamma + \sin^1(R_H/A))\cos G)$
($c_x$) $(A \cos \beta \sin \Gamma + H \cos G)\cos \sigma + A \sin \beta \sin \sigma$
($c_y$) $A \sin \beta \cos \sigma - (A \cos \beta \sin \Gamma + H \cos G)\sin \sigma$
($c_z$) $-A \cos \beta \cos \Gamma + H \sin G$ wherein $\phi_T$ is the instantaneous transverse pressure angle
$\Gamma$ is the cone angle of the base cone
$R_H$ is the radius of the base helix base circle
$A$ is the base cone distance
$G$ is equal to the cone angle $\Gamma$ of the base cone
$\beta$ is $\tan \phi_T \tan \Gamma$
$H$ is the distance of the cutter axis from the plane of action
$\sigma$ is $\tan^{-1}(\tan(\beta+\Psi)\sin G)$
$\Psi$ is $\sin^{-1}(R_H/A)$ and wherein the values of $\phi_T$ and A are independently variable.

16. The method of claim 6 applied to the machining of an external bevel gear, wherein the rotating cutter is movable linearly relative to the gear blank along three mutually perpendicular axes two of which determine a reference plane,
the axis of the base cone is tilted to place an element of said base cone parallel to said reference plane and tangent to said plane of action,
the path of said relative rolling motion is a circular path in the plane of action centered on the intersection of the base cone axis with the plane of action, and
said instantaneous direction of any point on the generating line is perpendicular to a radius in said plane of action from said intersection to such point.

17. The method of claim 16 wherein the tooth-profile cutting portion of the cutting path is a circular plane perpendicular to the plane of action, the axis of the cutter is parallel to the reference plane and rotated about an axis perpendicular to said reference plane and translated parallel to said reference plane to achieve said instantaneous velocity in said circular path in the plane of action.

18. The method of claim 16 wherein the tooth-profile cutting portion of said cutting path is a cone and the generating line is a conic section arc to the center of which an element of the conical cutting path is perpendicular, said arc spanning the face width of the gear blank, and the axis of the cutter pivots about an axis perpendicular to the reference plane and translates parallel to said reference plane to move said generating line in said circular path as the gear blank rotates.

19. The method of claim 16 wherein the tooth-profile cutting portion of said cutting path is a cylinder whose axis is perpendicular to said reference plane, the generating line is a circular arc spanning the face width of the gear blank, and, as said gear blank rotates, said cutter axis is translated parallel to said reference plane in a circular path to move the generating line in said circular path of relative rolling motion.

20. The method of claim 7 applied to the machining of an external bevel gear, wherein the two rotating cutters are each movable linearly relative to the gear blank along three mutually perpendicular axes and two of said three axes of linear movement of each cutter determine a common reference plane, the axis of the base cone is tilted to place an element thereof parallel to said reference plane and tangent to said plane of action, the path of said relative rolling motion is a circular path in the plane of action centered on the intersection of the base cone axis with the plane of action, said instantaneous direction of any point on the generating line of either cutter is perpendicular to a radius in said plane of action from said intersection to such point, and the generating lines of said cutters at the centers thereof intersect equal radii of the circular plane of action at equal angles and said radii are spaced apart by a transverse base tangent angle.

21. The method of claim 20 wherein the tooth-profile cutting portion of the cutting path of each cutter is a circular plane perpendicular to the plane of action, and the axis of each cutter is parallel to said reference plane, pivots about an axis perpendicular to said reference plane, and translates parallel to said reference plane to achieve said instantaneous velocity in said circular path in the plane of action.

22. The method of claim 20 wherein the tooth-profile cutting portion of the cutting path of each cutter is a cone and the generating line of each is a conic section arc to the center of which an element of the cone is perpendicular, each said arc spans the face width of the gear blank, said generating lines at the centers thereof intersect equal radii of the circular plane of action at equal angles and with said radii spaced apart by a transverse base surface angle, and the axis of each cutter is rotated about an axis perpendicular to the reference plane and translated paallel to said reference plane to move each generating line in said circular path of relative rolling motion as the gear blank rotates.

23. The method of claim 20 wherein the tooth-profile cutting portion of the cutting path of each cutter is a cylinder whose axis is perpendicular to said reference plane and whose generating line is a circular arc spanning the face width of the gear blank, and the axis of each cutter translates in a circular path parallel to said reference plane to move the generating line of each cutter in said circular path of relative rolling motion as the gear blank rotates.

24. The method of claim 6 utilized to produce buttress teeth on cylindrical gears, wherein the machining of the opposite profiles of the gear teeth is effected from concentric base cylinders of different radii.

25. The method of claim 12 utilized to produce buttress teeth on cylindrical gears wherein the cutter axis is moved linearly in the cutter-axis plane so that said component of motion of its generating line has a velocity equal to the peripheral velocity of a base cylinder of one radius for one tooth profile and of a base cylinder of different radius for the opposite profile.

26. The method of claim 8 utilized to produce buttress teeth, wherein the relative feeding movements of the two cutters proceed simultaneously with different values of said component velocities equal respectively to the peripheral velocities of base cylinders of the different radii necessary for involute profiles of the different desired pressure angles on opposite profiles of the same tooth.

27. The method of claim 5 utilized to produce buttress teeth on bevel gears wherein the machining of the opposite profiles of the gear teeth is effected from concentric base cones of coincident apices and different apex angles.

28. The method of claim 14 utilized to produce buttress teeth on bevel gears wherein the machining of the opposite profiles of the gear teeth is effected from concentric base cones of coincident apices and different apex angles.

29. The method of claim 16 utilized to produce buttress teeth on bevel gears wherein the machining of the opposite profiles of the gear teeth is effected from concentric base cones of coincident apices and different apex angles.

30. The method of claim 1 wherein the relative feeding movement of the gear blank and rotating cutter is accomplished by rotating the gear blank about the axis of its base surface and by simultaneously moving the cutter so as to cause at least one point on said generating line to maintain an instantaneous component of velocity in said instantaneous direction equal to the instantaneous peripheral velocity of the base surface at the projection of said one point to said line of tangency along the path of said relative rolling movement, and wherein any change of said controlled angularity is achieved by pivoting said generating line in the plane of action about said one point.

31. The method of claim 30 wherein said one point is located at the center of said generating line.

32. The method of claim 30 applied to machine meshing conical gears with non-intersecting axes wherein the contacting profiles of the teeth of the two gears are generated from a pair of base cones having non-coincident apices in a common plane of action tangent to both cones, the circular paths of said pair of base cones in said common plane of action overlap, the zone of action of the contacting profiles occurs within said overlap, and said angularity of the generating line of each of the contacting tooth profiles is controlled so as to cause said generating line to coincide with the generating line of the contacting tooth profile of the meshing gear as each generating line traverses the zone of action.

33. The method of claim 32 wherein the opposite contacting profiles of the teeth of the meshing gears are generated as specified in claim 32 from a second pair of base cones tangent with non-coincident apices to a second plane of action, the two base cones of each gear being coaxial and having different apices.

34. The method of claim 30 applied to machine one of a pair of meshing conical gears with non-intersecting axes wherein the opposite profiles of the teeth are generated from different base cones which are coaxial but have non-coincident apices.

35. The method of claim 2 wherein the cutting path surface includes a conical back portion extending from said rim portion toward the cutter axis in diverging spaced relation to said tooth-profile cutting portion, said rim and back portions of the cutting path surface serving to remove metal from the gear blank between adjacent teeth and the tooth-profile cutting portion serving to generate the tooth profile.

36. The method of claim 11 wherein the cutting path surface includes a back portion extending from said rim portion toward the cutter axis in spaced relation to said tooth-profile cutting portion, said rim and back portions serving to remove metal from the blank between adjacent teeth during alternate traverses.

37. The method of claim 13 wherein the cutting path surface of each cutter includes a back portion extending from said rim portion toward the cutter axis in spaced relation to said tooth-profile cutting portion, said rim and back portions serving to remove metal from the blank between adjacent teeth during alternate traverses.

38. The method of claim 8 wherein the cutting path surface of each cutter includes a back portion extending from said rim portion toward the cutter axis in spaced relation to said tooth-profile cutting portion, said rim and back portions serving to remove metal from the blank between adjacent teeth during alternate traverses.

39. The method of claim 9 wherein the cutting path surface of each cutter includes a back portion extending from said rim portion toward the cutter axis in spaced relation to said tooth-profile cutting portion, said rim and back portions serving to remove metal from the blank between adjacent teeth during alternate traverses.

40. The method of claim 21 wherein the cutting path surface of each cutter includes a back portion extending from said rim portion toward the cutter axis in spaced relation to said tooth-profile cutting portion, said rim and back portions serving to remove metal from the blank between adjacent teeth during alternate traverses.

* * * * *

UNITED STATES PATENT AND TRADEMARK OFFICE
CERTIFICATE OF CORRECTION

PATENT NO. : 4,565,474
DATED : January 21, 1986
INVENTOR(S) : Paul A. S. Charles It is certified that error appears in the above-identified patent and that said Letters Patent is hereby corrected as shown below:

REFERENCES CITED

Change "Enkfritz" to --Erkfritz--.

IN THE SPECIFICATION

Column 11, line 35, change "transvese" to --transverse--.

Column 19, line 17, after "cutting" delete --a--.

Column 21, line 59, change "$\nu_T$" to --$\theta_T$--.

Column 22, line 15, change "$\tau$" to --$\Gamma$--.

Column 24, line 59, change "$\phi'$" to --$\alpha'$--.

IN THE CLAIMS

Column 32, line 13, change "plung-cutting" to
     --plunge-cutting--.

Column 34, line 12, change "...+$\sin^1(R_H/A)$..." to
     --...+$\sin^{-1}(R_H/A)$...--.

UNITED STATES PATENT AND TRADEMARK OFFICE
CERTIFICATE OF CORRECTION

PATENT NO. : 4,565,474

DATED : January 21, 1986

INVENTOR(S) : Paul A. S. Charles

It is certified that error appears in the above-identified patent and that said Letters Patent is hereby corrected as shown below:

Column 35, line 41, change "paallel" to --parallel--.

Signed and Sealed this

Sixth Day of May 1986

[SEAL]

*Attest:*

*Attesting Officer*

DONALD J. QUIGG

*Commissioner of Patents and Trademarks*